(12) United States Patent
Gosalia

(10) Patent No.: US 12,079,320 B2
(45) Date of Patent: *Sep. 3, 2024

(54) LOGIN FROM AN ALTERNATE ELECTRONIC DEVICE

(71) Applicant: PayPal, Inc., San Jose, CA (US)

(72) Inventor: Jigar Gosalia, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/683,271

(22) Filed: Feb. 28, 2022

(65) Prior Publication Data

US 2022/0188396 A1    Jun. 16, 2022

Related U.S. Application Data

(63) Continuation of application No. 16/295,949, filed on Mar. 7, 2019, now Pat. No. 11,288,347.

(51) Int. Cl.
*G06F 21/32* (2013.01)
*G06F 21/34* (2013.01)
(Continued)

(52) U.S. Cl.
CPC .............. *G06F 21/32* (2013.01); *G06F 21/34* (2013.01); *H04L 9/3236* (2013.01); *G06F 9/45533* (2013.01); *G06F 2221/2111* (2013.01); *G06F 2221/2137* (2013.01); *G06F 2221/2151* (2013.01)

(58) Field of Classification Search
CPC .. G06F 21/32; G06F 21/34; G06F 2221/2111; G06F 2221/2137; G06F 2221/2151; G06F 9/452; G06F 9/45533; H04L 9/3236; H04L 63/0876; H04L 63/107; H04L 63/108; H04L 63/0853; H04L 63/0884; H04L 2463/121

See application file for complete search history.

(56) References Cited

U.S. PATENT DOCUMENTS 7,257,767 B1 * 8/2007 Carden, Jr. ........... G06F 40/151
707/999.102
7,263,655 B1 * 8/2007 Carden, Jr. ........... G06F 40/106
707/E17.116

(Continued)

*Primary Examiner* — David Garcia Cervetti
(74) *Attorney, Agent, or Firm* — Greenberg Traurig, LLP

(57) ABSTRACT

Systems and techniques for providing login from an alternate electronic device are presented. A system can receive hash data associated with first fingerprint data and a timestamp from a first electronic device in response to a determination that the first electronic device satisfies a defined criterion associated with a terminal computing request. The system can also form a correlation between the first electronic device and a second electronic device within a geographic area associated with the first electronic device based on the timestamp, first location data associated with the first electronic device, and second location data associated with the second electronic device. Furthermore, the system can initiate display of a graphical user interface on the second electronic device in response to a determination that second fingerprint data provided to the second electronic device within a timeframe associated with the timestamp matches the first fingerprint data associated with the hash data.

20 Claims, 12 Drawing Sheets

(51) Int. Cl.
*H04L 9/32* (2006.01)
*G06F 9/455* (2018.01)

(56) References Cited

U.S. PATENT DOCUMENTS

| | | | |
|---|---|---|---|
| 7,412,581 B2 | 8/2008 | Morita et al. | |
| 7,660,981 B1* | 2/2010 | Hunt | H04L 9/3265 726/19 |
| 8,458,363 B2* | 6/2013 | Rosenblatt | F01N 3/103 709/248 |
| 8,576,730 B2* | 11/2013 | Stephens | H04L 1/0045 370/252 |
| 8,607,054 B2 | 12/2013 | Ramarathinam et al. | |
| 8,612,410 B2* | 12/2013 | Meredith | G06F 16/9537 707/769 |
| 8,996,037 B2* | 3/2015 | Chen | G01S 5/02521 455/457 |
| 9,008,684 B2* | 4/2015 | Tipton | H04W 4/025 455/410 |
| 9,053,513 B2* | 6/2015 | Meredith | H04W 4/029 |
| 9,148,742 B1* | 9/2015 | Koulomzin | H04W 4/00 |
| 9,196,157 B2* | 11/2015 | Hardin | H04W 4/02 |
| 9,239,929 B1* | 1/2016 | Yu | H04W 4/029 |
| 9,252,962 B1* | 2/2016 | Valeti | H04L 12/1827 |
| 9,292,731 B2* | 3/2016 | Carrizo | H04L 63/0861 |
| 9,319,407 B1* | 4/2016 | Mauer | H04L 63/0884 |
| 9,417,835 B2* | 8/2016 | Tait | G06F 3/1446 |
| 9,444,805 B1* | 9/2016 | Saylor | H04L 63/08 |
| 9,819,665 B1* | 11/2017 | Machani | H04L 63/08 |
| 9,881,201 B2* | 1/2018 | Bartlett, II | H04W 4/02 |
| 10,231,128 B1* | 3/2019 | Ziraknejad | H04W 12/08 |
| 10,489,103 B1* | 11/2019 | Gruebele | G06F 1/3275 |
| 10,733,594 B1* | 8/2020 | Dai Zovi | H04L 63/1425 |
| 10,855,664 B1* | 12/2020 | Ziraknejad | H04W 4/02 |
| 11,256,294 B2* | 2/2022 | Yang | G06F 9/445 |
| 2002/0113707 A1* | 8/2002 | Grunes | G06K 1/18 340/572.1 |
| 2003/0149588 A1* | 8/2003 | Joao | G06Q 50/184 705/310 |
| 2004/0260733 A1* | 12/2004 | Adelstein | H04L 63/123 709/224 |
| 2005/0066172 A1* | 3/2005 | Vorbruggen | G06T 1/0071 705/317 |
| 2006/0026288 A1* | 2/2006 | Acharya | H04L 65/1104 709/227 |
| 2006/0146767 A1* | 7/2006 | Moganti | H04L 67/14 370/338 |
| 2006/0185005 A1* | 8/2006 | Graves | G16Z 99/00 707/E17.001 |
| 2008/0000959 A1* | 1/2008 | Faoro | B60R 25/102 235/375 |
| 2008/0027791 A1* | 1/2008 | Cooper | G06Q 10/0639 705/7.42 |
| 2008/0037836 A1* | 2/2008 | Chen | G06V 40/176 382/103 |
| 2008/0215474 A1* | 9/2008 | Graham | G06Q 40/04 715/764 |
| 2009/0287931 A1* | 11/2009 | Kinsella | G06F 21/64 709/206 |
| 2009/0288164 A1* | 11/2009 | Adelstein | H04L 63/123 726/22 |
| 2010/0217979 A1* | 8/2010 | Yaghmour | H04L 63/06 713/168 |
| 2010/0268831 A1* | 10/2010 | Scott | H04W 12/069 709/228 |
| 2010/0299430 A1* | 11/2010 | Powers | H04L 63/1416 709/224 |
| 2011/0153854 A1* | 6/2011 | Chickering | H04L 63/0815 709/227 |
| 2011/0184910 A1* | 7/2011 | Love | G06F 16/2477 707/610 |
| 2011/0312301 A1* | 12/2011 | Muller | H04W 12/06 455/411 |
| 2012/0057039 A1* | 3/2012 | Gardiner | H04N 23/611 348/222.1 |
| 2012/0250858 A1* | 10/2012 | Iqbal | H04L 9/0861 380/44 |
| 2012/0254447 A1* | 10/2012 | Popescu | H04L 63/0442 709/227 |
| 2013/0054958 A1* | 2/2013 | Braness | H04N 21/6581 709/219 |
| 2014/0050372 A1* | 2/2014 | Qi | G06V 10/772 382/118 |
| 2014/0156657 A1* | 6/2014 | Kottoor | G06Q 50/26 707/736 |
| 2014/0171102 A1* | 6/2014 | Murphy | H04W 64/00 455/456.1 |
| 2014/0195974 A1* | 7/2014 | Ballard | G06F 21/36 715/825 |
| 2014/0223171 A1* | 8/2014 | Novack | H04L 9/3231 713/176 |
| 2014/0270410 A1* | 9/2014 | Stuntebeck | H04W 12/08 382/118 |
| 2014/0313307 A1* | 10/2014 | Oh | G06F 3/013 348/78 |
| 2014/0351175 A1* | 11/2014 | Venkat | H04W 4/029 706/46 |
| 2014/0379811 A1* | 12/2014 | Chan | H04W 8/24 709/205 |
| 2015/0026351 A1* | 1/2015 | Calman | H04L 65/1083 709/227 |
| 2015/0032889 A1* | 1/2015 | Chan | H04L 67/1001 709/224 |
| 2015/0081559 A1* | 3/2015 | Dua | G06Q 20/3674 705/44 |
| 2015/0113048 A1* | 4/2015 | Limburn | H04W 4/023 709/203 |
| 2015/0141060 A1* | 5/2015 | Shan | H04W 4/21 455/566 |
| 2015/0163766 A1* | 6/2015 | Weiss | G01S 5/14 705/26.81 |
| 2015/0172929 A1* | 6/2015 | Tipton | H04W 4/025 455/411 |
| 2015/0241549 A1* | 8/2015 | Kinamon | G01S 5/02521 455/456.1 |
| 2015/0270961 A1* | 9/2015 | Barnett | H04L 9/0861 713/189 |
| 2015/0381621 A1* | 12/2015 | Innes | H04W 12/069 726/7 |
| 2016/0057139 A1* | 2/2016 | McDonough | H04L 63/168 726/6 |
| 2016/0078211 A1* | 3/2016 | Newton | H04L 63/107 726/7 |
| 2016/0173617 A1* | 6/2016 | Allinson | H04L 67/148 709/227 |
| 2016/0182237 A1* | 6/2016 | Almgren | H04L 9/321 713/155 |
| 2017/0048686 A1* | 2/2017 | Chang | H04W 52/0209 |
| 2017/0091699 A1* | 3/2017 | Mueller | H04W 4/023 |
| 2017/0195339 A1* | 7/2017 | Brown | H04W 4/80 |
| 2017/0220815 A1* | 8/2017 | Ansari | G06Q 20/36 |
| 2017/0237569 A1* | 8/2017 | Vandervort | H04L 63/061 713/171 |
| 2017/0244555 A1* | 8/2017 | Beiter | H04L 9/3226 |
| 2017/0357441 A1* | 12/2017 | Sanciangco | H04M 1/72412 |
| 2018/0026790 A1* | 1/2018 | Seo | H04L 9/3236 713/181 |
| 2018/0048945 A1* | 2/2018 | Al Mohizea | H04N 5/9201 |
| 2018/0068091 A1* | 3/2018 | Gaidar | G06F 21/16 |
| 2018/0182050 A1* | 6/2018 | McIntyre | G06Q 10/087 |
| 2018/0182051 A1* | 6/2018 | McIntyre | G06Q 10/087 |
| 2018/0189078 A1* | 7/2018 | Wadley | G06F 9/453 |
| 2018/0191831 A1* | 7/2018 | Wadley | H04L 67/131 |
| 2018/0213361 A1* | 7/2018 | Venkat | H04W 4/029 |
| 2018/0232515 A1* | 8/2018 | Guo | G06F 21/41 |
| 2018/0285810 A1* | 10/2018 | Ramachandran | G06Q 10/087 |
| 2018/0324152 A1* | 11/2018 | Jarchafjian | H04W 12/63 |
| 2018/0343110 A1* | 11/2018 | Funk | H04L 9/0838 |
| 2018/0367532 A1* | 12/2018 | Wilson | H04L 63/0853 |
| 2019/0103975 A1* | 4/2019 | Jacobs | H04L 9/3239 |

(56) References Cited

U.S. PATENT DOCUMENTS

| | | | |
|---|---|---|---|
| 2019/0114395 A1* | 4/2019 | Lenchner | H04L 9/3239 |
| 2019/0156065 A1* | 5/2019 | Comanescu | H04L 9/3239 |
| 2019/0165943 A1* | 5/2019 | Chari | H04L 9/3221 |
| 2019/0228086 A1* | 7/2019 | Bordens | G06F 16/219 |
| 2019/0279321 A1* | 9/2019 | Sheets | G06Q 50/184 |
| 2019/0287199 A1* | 9/2019 | Messerges | H04L 51/18 |
| 2019/0297089 A1* | 9/2019 | Bryant | G01S 11/06 |
| 2019/0303579 A1* | 10/2019 | Reddy | H04L 9/3239 |
| 2019/0327227 A1* | 10/2019 | Tobkes | H04L 67/52 |
| 2020/0021580 A1* | 1/2020 | Nie | H04L 63/10 |
| 2020/0053072 A1* | 2/2020 | Glozman | H04W 12/08 |
| 2020/0112564 A1* | 4/2020 | Hutchinson | H04W 12/084 |
| 2020/0145385 A1* | 5/2020 | Chauhan | H04L 63/0281 |
| 2020/0162262 A1* | 5/2020 | Shekh-Yusef | H04L 63/107 |
| 2020/0168033 A1* | 5/2020 | Mcqueen | G07F 17/3218 |
| 2020/0186354 A1* | 6/2020 | Balinsky | G06K 15/4095 |
| 2020/0186358 A1* | 6/2020 | Capola | H04L 9/3228 |
| 2020/0327629 A1* | 10/2020 | Spangenberg | G06Q 50/184 |
| 2020/0371192 A1* | 11/2020 | Khan | H04B 17/318 |
| 2020/0372184 A1* | 11/2020 | Meirosu | H04L 9/3247 |
| 2020/0382277 A1* | 12/2020 | Kong | H04L 9/3297 |
| 2021/0065701 A1* | 3/2021 | van Scheltinga | G06F 3/167 |
| 2021/0201623 A1* | 7/2021 | Grumet | G07F 17/3223 |
| 2021/0342427 A1* | 11/2021 | Popov | G06F 21/316 |
| 2021/0357181 A1* | 11/2021 | Sarir | G06F 3/0482 |
| 2022/0078008 A1* | 3/2022 | Kong | H04L 9/0894 |

* cited by examiner

LOGIN FROM AN ALTERNATE ELECTRONIC DEVICE

CROSS-REFERENCE TO RELATED APPLICATIONS

This application is a continuation of and claims priority to U.S. patent application Ser. No. 16/295,949, filed Mar. 7, 2019, which is incorporated herein by reference in its entirety.

TECHNICAL FIELD

This disclosure related generally to electronic devices, and more specifically, to delegating functionalities of an electronic device.

BACKGROUND

Electronic devices such as smartphones provide numerous capabilities and/or services. For example, a mobile application on an electronic device can provide one or more services and/or one or more functionalities to a user that employs the electronic device. However, electronic devices such as a smartphone typically have limited battery life. An electronic device can turn off while a user is employing a mobile application due to battery drainage. Furthermore, an electronic device such as a smartphone generally has one or more service limitations. As such, the electronic device can turn off while executing a mobile application due to, for example, loss of a network connection.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
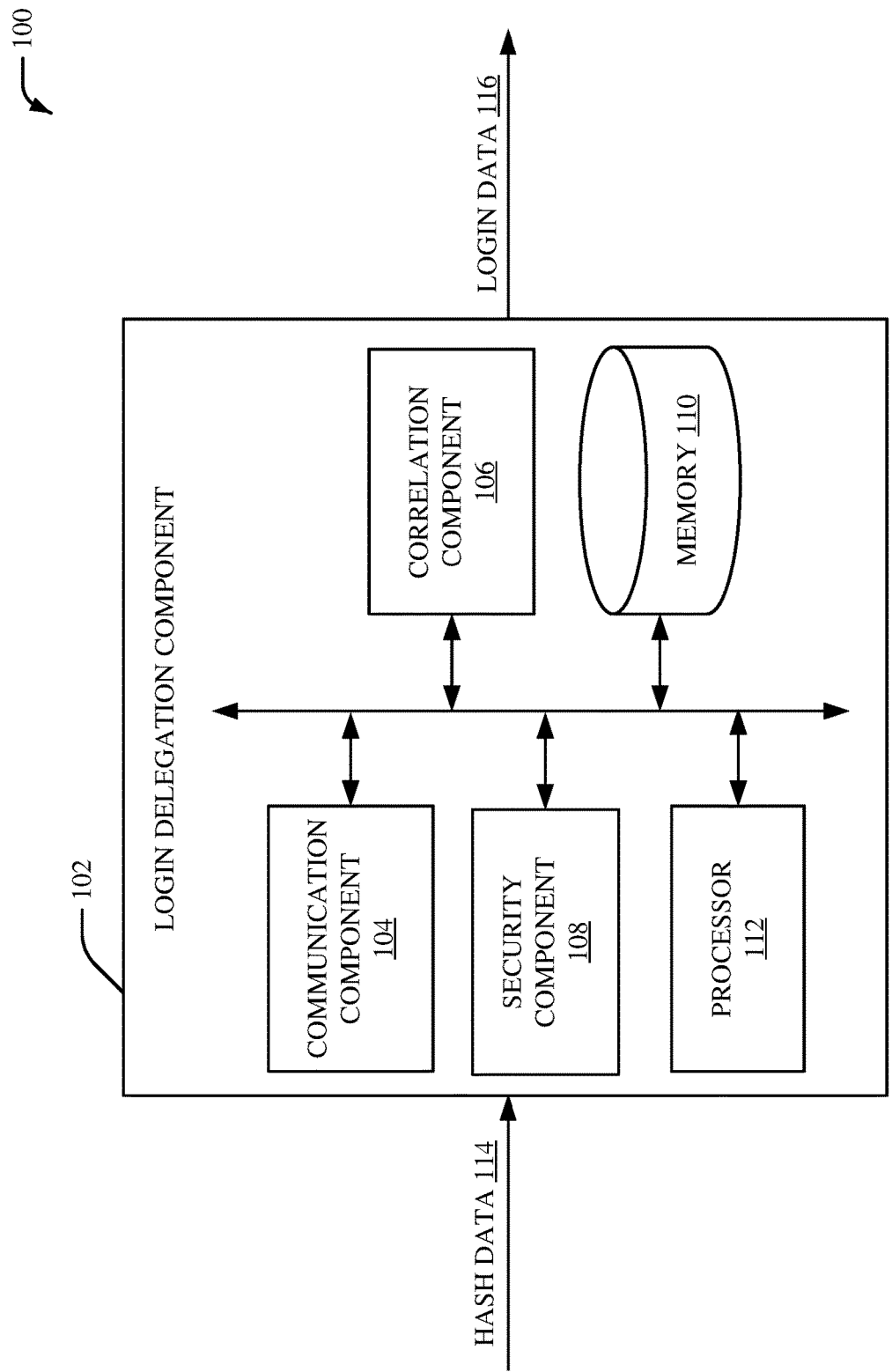
FIG. 1 illustrates a block diagram of an example, non-limiting system that includes a login delegation component in accordance with one or more embodiments described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Systems and techniques for providing login from an alternate electronic device are presented. In an embodiment, a terminal computing request associated with an electronic device can be initiated. For example, an owner of the electronic device can initiate the terminal computing request via a graphical user interface of the electronic device. In another example, the electronic device can generate the terminal computing request in response to a determination that a condition associated with the electronic device satisfies a defined criterion. In response to the terminal computing request, a signal can be broadcasted to one or more other electronic devices within a geofence associated with the electronic device. The signal broadcasted to the one or more other electronic devices can include information related to the electronic device. The signal broadcasted to the one or more other electronic devices can additionally or alternatively include a timestamp associated with an interval of time for the terminal computing request. Additionally, the signal broadcasted to the one or more other electronic devices can be transmitted to a server. The server can store the information related to the electronic device and/or the timestamp. For instance, the server can store the information related to the electronic device and/or the timestamp in cache memory (e.g., a low-latency secured cache memory).

In certain embodiments, in response to the terminal computing request, hash data associated with the electronic device and/or a user identity for the electronic device can be generated. For example, the hash data can include a time-based one-way hash (e.g., a time-based token). The hash data can be generated, for example, by an operating system of the electronic device. Furthermore, the hash data can be readable by the operating system of the electronic device and/or a different operating system. In another embodiment, the one or more other electronic devices can send an acknowledgement message to the server. The acknowledgement message can include information such as identification information for the one or more other electronic devices, location information for the one or more other electronic devices, the information related to the electronic device, and/or the timestamp. Additionally, the server can form a correlation between the electronic device and the one or more other electronic devices based on the information included in the acknowledgement message. For example, the server can form a correlation between the electronic device and the one or more other electronic devices based on information such as identification information for the one or more other electronic devices, location information for the one or more other electronic devices, location information for the electronic device, the information related to the electronic device, and/or the timestamp.

In certain embodiments, the server can send the hash data to the one or more other electronic devices. The hash data provided to the one or more other electronic device can be transmitted via a message that can be automatically deleted after a certain amount of time associated with the timestamp. The message transmitted to the one or more other electronic devices can also include the information related to the electronic device. Additionally or alternatively, the message transmitted to the one or more other electronic devices can instruct the one or more other electronic devices to facilitate a user accessing a graphical user interface of the one or more other electronic devices during a period of time associated with the timestamp based on comparison between fingerprint data provided to the one or more other electronic devices and fingerprint data included in the hash data. In an aspect, the electronic device can be associated with user identity. Accordingly, in certain embodiments, the server can determine whether user identity for the electronic device is associated with a different electronic device and information related to the different electronic device can also be provided to the server to facilitate correlation between the electronic device and the one or more other electronic devices.

In yet another embodiment, a terminal computing session can be initiated on the one or more other electronic devices based on correlation between the electronic device and the one or more other electronic devices. For example, a graphical user interface can be provided on the one or more other electronic devices in response to a determination that fingerprint data provided to the one or more other electronic devices within a timeframe associated with the timestamp matches fingerprint data associated with the electronic device. In an example, a user can scan a fingerprint via the one or more other electronic devices during a period of time associated with the timestamp. The fingerprint can be compared to a set of fingerprints stored in a database that includes the fingerprint data associated with the hash data for the electronic device. In certain embodiments, a facial recognition process can be performed to capture a facial image of the user to facilitate identification of the user and/or one or more electronic devices associated with the user. In response to a match between the fingerprint of the user and a fingerprint included in the set of fingerprints, the user can be provided access to the one or more other electronic devices for a predefined time period (e.g., the next five minutes) to, for example, execute a transaction at a location associated with the electronic device that generated the terminal computing request. As such, a computing experience associated with an electronic device can be improved. Furthermore, one or more limitations of an electronic device (e.g., limited battery life of an electronic device, service limitations of an electronic device, etc.) can be circumvented. Security associated with a transaction executed on an electronic device can also be improved. Moreover, reliability of execution of a transaction by a server associated with a transaction system can be improved.

According to an embodiment, a system comprises a non-transitory memory storing instructions. The system also comprises a processor. The processor is configured to execute the instructions to cause the system to receive hash data associated with first fingerprint data and a timestamp from a first electronic device in response to a determination that the first electronic device satisfies a defined criterion associated with a terminal computing request. The processor is also configured to execute the instructions to cause the system to form a correlation between the first electronic device and a second electronic device within a geographic area associated with the first electronic device based on the timestamp, first location data associated with the first electronic device, and second location data associated with the second electronic device. Furthermore, the processor is configured to execute the instructions to cause the system to initiate a virtual machine that displays a graphical user interface on the second electronic device in response to a determination that second fingerprint data provided to the second electronic device within a timeframe associated with the timestamp matches the first fingerprint data associated with the hash data.

According to another embodiment, a system can include a communication component, a correlation component and/or a security component. The communication component can receive hash data associated with first fingerprint data and/or a timestamp from a first electronic device in response to a determination that the first electronic device satisfies a defined criterion associated with a terminal computing request. The correlation component can form a correlation between the first electronic device and a second electronic device within a geographic area associated with the first electronic device based on the timestamp, first location data associated with the first electronic device, and/or second location data associated with the second electronic device. The security component can initiate a virtual machine that displays a graphical user interface on the second electronic device in response to a determination that second fingerprint data provided to the second electronic device within a timeframe associated with the timestamp matches the first fingerprint data associated with the hash data.

In yet another embodiment, a method can provide for receiving, by a system operatively coupled to a processor, a request message indicative of a request for a user identity related to a first electronic device to access one or more functions of a second electronic device. The method can also provide for receiving, by the system, hash data associated with first fingerprint data from the first electronic device in response to a first determination that the request message satisfies a defined criterion. Furthermore, the method can provide for displaying, by the system, a graphical user interface on the second electronic device in response to a second determination that second fingerprint data provided to the second electronic device within a timeframe associated with a timestamp matches the first fingerprint data associated with the hash data.

In yet another embodiment, a computer readable storage device can comprise instructions that, in response to execution, cause a system comprising a processor to perform operations, comprising: receiving hash data associated with first fingerprint data from a first electronic device in response to a determination that the first electronic device satisfies a defined criterion associated with a terminal computing request, forming a correlation between the first electronic device and a second electronic device within a geographic area associated with the first electronic device based on a timestamp associated with the hash data, first location data associated with the first electronic device, and second location data associated with the second electronic device, and initiating display of a graphical user interface on the second electronic device in response to a determination that second fingerprint data provided to the second electronic device within a timeframe associated with the timestamp matches the first fingerprint data associated with the hash data.

Referring initially to FIG. 1, there is illustrated an example system 100 that provides login from an alternate electronic device, in accordance with one or more embodiments described herein. The system 100 can be implemented on or in connection with a network of servers associated with an enterprise application. In one example, the system 100 can be associated with a cloud-based platform. In an embodiment, the system 100 can be associated with a computing environment that comprises one or more servers and/or one or more software components that operate to perform one or more processes, one or more functions and/or one or more methodologies in accordance with the described embodiments. A sever as disclosed herein can include, for example, stand-alone server and/or an enterprise-class server operating a server operating system (OS) such as a MICROSOFT® OS, a UNIX® OS, a LINUX® OS, and/or another suitable server-based OS. It is to be appreciated that one or more operations performed by a server and/or one or more services provided by a server can be combined, distributed, and/or separated for a given implementation. Furthermore, one or more servers can be operated and/or maintained by a corresponding entity or different entities. The system 100 can be employed by various systems, such as, but not limited to transaction systems, payment systems, online transaction systems, online payment systems, server systems, electronic device systems, mobile device systems, smartphone systems, virtual machine systems, consumer service systems, security systems, encryption systems, cryptography systems, hash generation systems, mobile application systems, login systems, financial systems, digital systems, machine learning systems, artificial intelligence systems, neural network systems, network systems, computer network systems, communication systems, enterprise systems, and the like. In one example, the system 100 can be associated with a Platform-as-a-Service (PaaS) and/or a transaction system. Moreover, the system 100 and/or the components of the system 100 can be employed to use hardware and/or software to solve problems that are highly technical in nature (e.g., related to encryption, related to cryptography, related to digital data processing, related to electronic devices, etc.), that are not abstract and that cannot be performed as a set of mental acts by a human.

The system 100 includes a login delegation component 102. In FIG. 1, the login delegation component 102 can include a communication component 104, a correlation component 106, and/or a security component 108. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the login delegation component 102) can include memory 110 for storing computer executable components and instructions. The system 100 (e.g., the login delegation component 102) can further include a processor 112 to facilitate operation of the instructions (e.g., computer executable components and instructions) by the system 100 (e.g., the login delegation component 102).

The login delegation component 102 (e.g., the communication component 104 of the login delegation component 102) can receive hash data 114. The hash data 114 can be a string of data generated by a hash function. For example, the hash data 114 can be an encrypted version of a digital data signature. In an aspect, the hash data 114 can include a time-based one-way hash (e.g., a time-based token). Furthermore, the hash data 114 can be generated by an operating system of an electronic device. In an embodiment, the hash data 114 can include first fingerprint data associated with a first electronic device (e.g., electronic device 404 shown in FIG. 4). For example, the first fingerprint data can be an encrypted version of a fingerprint of a user (e.g., a user identity) associated with the first electronic device. Furthermore, the first fingerprint data can be employed to verify the user and/or to log the user into the first electronic device. As such, the first fingerprint data can be biometric data for the user (e.g., the user identity) associated with the first electronic device. Additionally or alternatively, the hash data 114 can include a timestamp associated with the first electronic device. The timestamp can be, for example, an interval of time for a terminal computing request. For example, the timestamp can indicate an interval of time to allow the user (e.g., the user identity) to login to an alternate electronic device.

The first electronic device can be, for example, an electronic device associated with a graphical user interface, e.g., the first electronic device can be a client device, a user device, a mobile device, a smart device, a smart phone, a tablet device, a handheld device, a portable computing device, a wearable device, a virtual reality device, a computer, a desktop computer, a laptop computer, a point of sale (POS) device, and/or another type of electronic device associated with a display. Furthermore, the first electronic device can include one or more computing capabilities and/or one or more communication capabilities. In an aspect, the first electronic device can provide one or more electronic device programs, such as system programs and application programs to perform various computing and/or communications operations. Some example system programs can include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Some example application programs can include, without limitation, a web browser application, a transaction application, a messaging application (e.g., e-mail, IM, SMS, MMS, telephone, voicemail, VoIP, video messaging, internet relay chat (IRC)), a contacts application, a calendar application, an electronic document application, a database application, a media application (e.g., music, video, television), a location-based services (LBS) application (e.g., GPS, mapping, directions, positioning systems, geolocation, point-of-interest, locator) that may utilize hardware components such as an antenna, and so forth. One or more of the electronic device programs can display a graphical user interface to present information to and/or receive information from one or more users of the first electronic device. In some embodiments, the electronic device programs can include one or more applications configured to conduct some or all of the functionalities and/or processes discussed herein.

In an embodiment, the communication component 104 can receive the hash data 114 from the first electronic device in response to a determination that the first electronic device satisfies a defined criterion associated with a terminal computing request. For example, the first electronic device can generate the terminal computing request in response to a determination that the first electronic device is associated with a defined condition. The terminal computing request can be, for example, a request to login to an electronic device program (e.g., a system program and/or an application program) from an alternate electronic device. In one embodiment, the first electronic device can generate the terminal computing request in response to a determination that a battery life of a battery of the first electronic device satisfies a defined criterion. For example, the first electronic device can generate the terminal computing request in response to a determination that a power level of a battery of the first electronic device corresponds to a defined power level threshold value. In another embodiment, the first electronic device can generate the terminal computing request in response to a determination that a network condition for the first electronic device satisfies a defined criterion. For example, the first electronic device can generate the terminal computing request in response to a determination that a strength of a communication network for first electronic device corresponds to a defined signal strength threshold value. In yet another embodiment, the first electronic device can generate the terminal computing request in response to a determination that a user initiates the terminal computing request via a graphical user interface of the first computing device. For example, the first electronic device can generate the terminal computing request in response to a determination that a command button for an application program on the first computing device is activated via a graphical user interface associated with the application program. In yet another embodiment, the application program can generate the terminal computing request.

Figure 4:
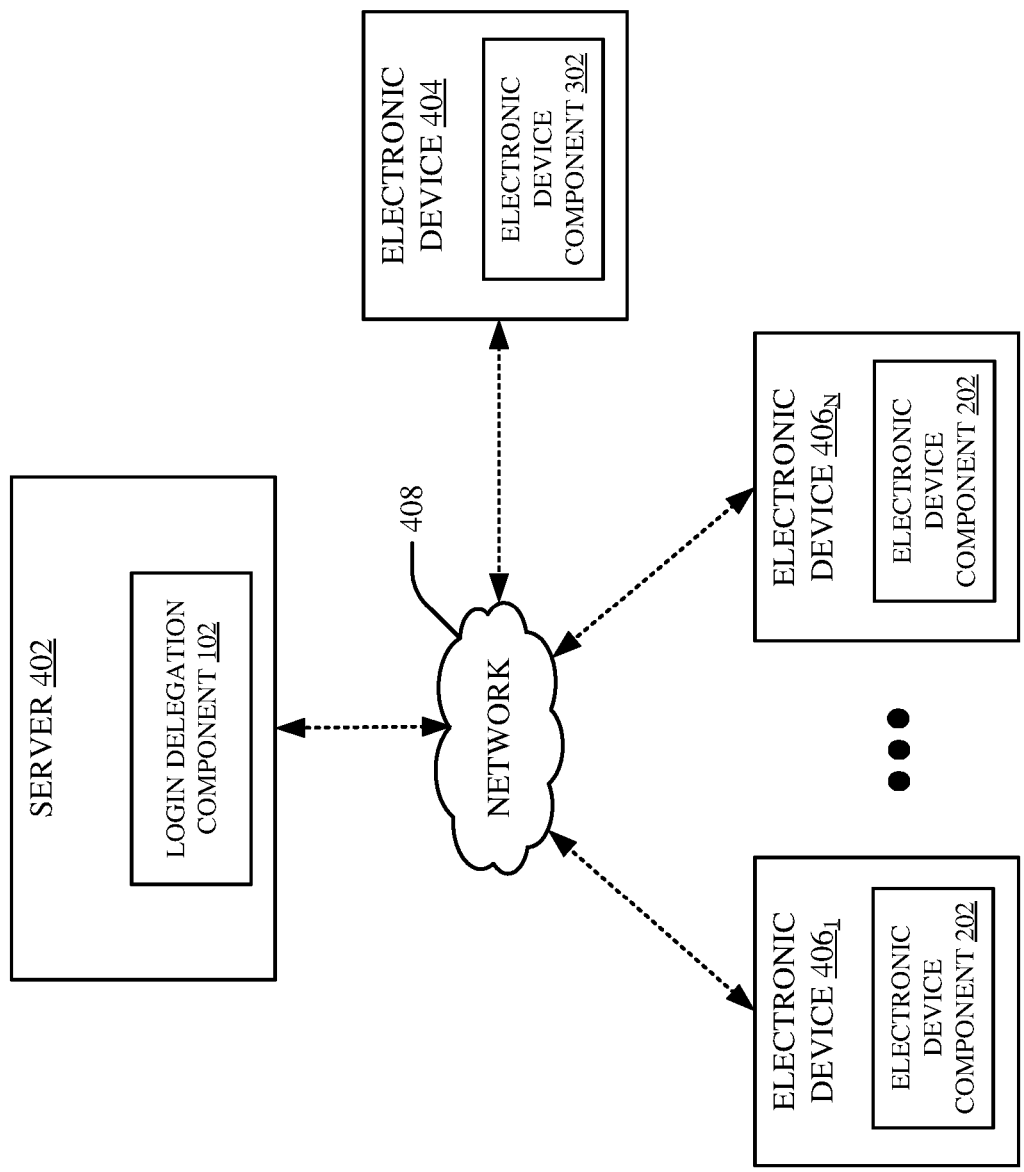
FIG. 4 illustrates an example, non-limiting system for providing login from an alternate electronic device in accordance with one or more embodiments described herein.

The correlation component 106 can form a correlation between the first electronic device and a second electronic device (e.g., electronic device 406₁ or electronic device 406ₙ from shown in FIG. 4). The second electronic device can be within a geographic area associated with the first electronic device. For example, the second electronic device can be within a certain distance and/or communication range around the first electronic device. The geographic area can be range limited, for example, such that communication between the first electronic device and a second electronic device can be within a predefined distance and/or area. In such an example, the geographic area can serve as a geofence around the first electronic device. The second electronic device can be an electronic device associated with a graphical user interface. For example, the first electronic device can be a client device, a user device, a mobile device, a smart device, a smart phone, a tablet device, a handheld device, a portable computing device, a wearable device, a virtual reality device, a computer, a desktop computer, a laptop computer, a POS device, and/or another type of electronic device associated with a display. Furthermore, the second electronic device can include one or more computing capabilities and/or one or more communication capabilities. In an embodiment, the first electronic device can be associated with a first user identity and the second electronic device can be associated with a second user identity. In an aspect, the second electronic device can provide one or more electronic device programs, such as system programs and application programs to perform various computing and/or communications operations. Some example system programs can include, without limitation, an operating system (e.g., MICROSOFT® OS, UNIX® OS, LINUX® OS, Symbian OS™, Embedix OS, BREW OS, JavaOS, a WAP OS, and others), device drivers, programming tools, utility programs, software libraries, APIs, and so forth. Some example application programs can include, without limitation, a web browser application, a transaction application, a messaging application (e.g., e-mail, IM, SMS, MMS, telephone, voice-mail, VoIP, IRC), a contacts application, a calendar application, an electronic document application, a database application, a media application (e.g., music, video, television), a LBS application (e.g., GPS, mapping, directions, positioning systems, geolocation, point-of-interest, locator) that may utilize hardware components such as an antenna, and so forth. One or more of the electronic device programs can display a graphical user interface to present information to and/or receive information from one or more users of the first electronic device. In some embodiments, the electronic device programs can include one or more applications configured to conduct some or all of the functionalities and/or processes discussed herein.

In an aspect, the correlation component 106 can form the correlation between the first electronic device and the second electronic device based on the timestamp included in the hash data 114, first location data associated with the first electronic device, and/or second location data associated with the second electronic device. For instance, the correlation component 106 can coordinate a terminal computing session between the first electronic device and the second electronic device based on the timestamp included in the hash data 114, first location data associated with the first electronic device, and/or second location data associated with the second electronic device. The terminal computing session can be valid for a certain period of time associated with the timestamp included in the hash data 114. The terminal computing session can additionally or alternatively be valid in response to a determination that the terminal computing session is executed at a location that satisfies a defined criterion associated with the first location data associated with the first electronic device, and/or the second location data associated with the second electronic device. In certain embodiments, the communication component 104 can transmit a message to the first electronic device to confirm accuracy of the hash data 114. Furthermore, the correlation component 106 can form the correlation between the first electronic device and the second electronic device in response to confirmation of the accuracy of the hash data 114.

In certain embodiments, the security component 108 can initiate display of a graphical user interface on the second electronic device in response to a determination that second fingerprint data provided to the second electronic device within a timeframe associated with the timestamp matches the first fingerprint data associated with the hash data 114. For instance, in an embodiment, the security component 108 can initiate a virtual machine that displays a graphical user interface on the second electronic device in response to a determination that second fingerprint data provided to the second electronic device within a timeframe associated with the timestamp matches the first fingerprint data associated with the hash data 114. In certain embodiments, the security component 108 can additionally or alternatively initiate the virtual machine that displays the graphical user interface on the second electronic device in response to a determination that sensor data associated with one or more sensors of the second electronic device satisfies a defined criterion. In certain embodiments, the security component 108 can additionally or alternatively initiate the virtual machine that displays the graphical user interface on the second electronic device in response to a determination that data from a secondary device associated with the second user identity satisfies a defined criterion. In certain embodiments, the security component 108 can additionally or alternatively initiate the virtual machine that displays the graphical user interface on the second electronic device in response to a determination that a camera recognition process and/or an audio recognition process associated with the second electronic device satisfies a defined criterion. The security component 108 can initiate the display of the graphical user interface and/or initiate the virtual machine that displays the graphical user interface on the second electronic device to begin the terminal computing session. In an aspect, the communication component 104 can transmit a message to the second electronic device to allow the display of the graphical user interface on the second electronic device. The security component 108 can initiate the display of the graphical user interface and/or initiate the virtual machine based on time data indicative of an interval of time for the second electronic device to render the graphical user interface. The time data can be associated with the timestamp included in the hash data 114. Furthermore, the security component 108 can initiate removal of the graphical user interface on the second electronic device based on the time data.

In another aspect, the security component 108 can generate login data 116. For instance, the login data 116 can include information associated with the terminal computing session. In an embodiment, the login data 116 can include information associated with a match between the second fingerprint data provided to the second electronic device within a timeframe associated with the timestamp matches the first fingerprint data associated with the hash data 114. Additionally or alternatively, the login data 116 can include information to initiate the display of the graphical user interface and/or the virtual machine that displays the graphical user interface on the second electronic device. In an embodiment, the login data 116 can include information associated with the graphical user interface on the second electronic device. Additionally or alternatively, the login data 116 can include information related to a type of application program associated with the second electronic device to render via the graphical user interface. The security component 108 can determine the type of application program, for example, based on user data for a user identity associated with the first electronic device. The login data 116 can include information related to a user identity associated with the first electronic device. For example, the login data 116 can include authentication data related to the user identity associated with the first electronic device, biometric data related to the user identity associated with the first electronic device, a pin number related to the user identity associated with the first electronic device, user data related to the user identity associated with the first electronic device, a date of birth related to the user identity associated with the first electronic device, information related to a prior transaction by the user identity associated with the first electronic device, location data related to the transaction by the user identity associated with the first electronic device, other location data related to the user identity associated with the first electronic device, two-factor authentication data related to the user identity associated with the first electronic device, CAPTCHA security data, one or more preferences related to the user identity associated with the first electronic device, and/or other information related to the user identity associated with the first electronic device. In certain embodiments, at least a portion of the login data 116 can be provided to the first electronic device via a graphical user interface of the first electronic device. Additionally or alternatively, at least a portion of the login data 116 can be provided by an application program on the first computing device. Additionally or alternatively, at least a portion of the login data 116 can be provided by a server for a transaction system associated with an application program on the first computing device.

In certain embodiments, in response to initiation of the virtual machine by the security component 108, the security component 108 can process a transaction executed via the graphical user interface on the second electronic device. The transaction can be related to a user identity associated with the first electronic device. For example, a user identity associated with the first electronic device can execute a financial transaction (e.g., a payment) via the graphical user interface on the second electronic device. In an embodiment, a user identity associated with the first electronic device can resume a transaction initiated on the first electronic device via the graphical user interface on the second electronic device. For example, a user identity associated with the first electronic device can resume access to a digital shopping cart initiated on the first electronic device and/or can complete a transaction begun on the first electronic device via the graphical user interface on the second electronic device.

In certain embodiments, the correlation component 106 can form an additional correlation between the first electronic device and a third electronic device within the geographic area associated with the first electronic device (e.g., in addition to the correlation between the first electronic device and the second electronic device) based on the timestamp, the first location data associated with the first electronic device, and/or third location data associated with the third electronic device. For instance, the correlation component 106 can coordinate an alternate terminal computing session between the first electronic device and the third electronic device based on the timestamp included in the hash data 114, the first location data associated with the first electronic device, and/or the third location data associated with the third electronic device. The alternate terminal computing session can be valid for a certain period of time associated with the timestamp included in the hash data 114. The alternate terminal computing session can additionally or alternatively be valid in response to a determination that the terminal computing session is executed at a location that satisfies a defined criterion associated with the first location data associated with the first electronic device, and/or the third location data associated with the third electronic device. Additionally, the security component 108 can initiate the virtual machine that displays an alternate graphical user interface on the third electronic device in response to a determination that third fingerprint data provided to the third electronic device within the timeframe associated with the timestamp matches the first fingerprint data associated with the hash data 114. In certain embodiments, the security component 108 can additionally or alternatively initiate the virtual machine that displays the alternate graphical user interface on the third electronic device in response to a determination that sensor data associated with one or more sensors of the third electronic device satisfies a defined criterion. In certain embodiments, the security component 108 can additionally or alternatively initiate the virtual machine that displays the alternate graphical user interface on the third electronic device in response to a determination that data from a secondary device associated with the third user identity satisfies a defined criterion. In certain embodiments, the security component 108 can additionally or alternatively initiate the virtual machine that displays the alternate graphical user interface on the third electronic device in response to a determination that a camera recognition process and/or an audio recognition process associated with the third electronic device satisfies a defined criterion.

In an embodiment, the security component 108 can additionally or alternatively initiate the virtual machine that displays the graphical user interface on the second electronic device based on authentication data associated with a secondary electronic device. The secondary electronic device can be, for example, an electronic device nearby the second electronic device. In a non-limiting example, the secondary electronic device can be a POS device or another electronic device that provides a secondary means of providing authentication. In certain embodiments, the security component 108 can additionally or alternatively initiate the virtual machine that displays the graphical user interface on the second electronic device in response to a determination that sensor data associated with one or more sensors of the secondary electronic device satisfies a defined criterion. In certain embodiments, the security component 108 can additionally or alternatively initiate the virtual machine that displays the graphical user interface on the second electronic device in response to a determination that a camera recognition process and/or an audio recognition process associated with the secondary electronic device satisfies a defined criterion. In a non-limiting example, fingerprint data for a user identity can be obtained by the second electronic device and a facial recognition process for the user identity can be performed via the secondary electronic device nearby the second electronic device.

In certain embodiments, to facilitate determining a match between fingerprint data (e.g., determining whether the second fingerprint data provided to the second electronic device matches the first fingerprint data associated with the hash data 114), the security component 108 can perform learning with respect to fingerprint data. The security component 108 can also generate inferences with respect to fingerprint data. The security component 108 can, for example, employ principles of artificial intelligence to facilitate determining a match between fingerprint data (e.g., determining whether the second fingerprint data provided to the second electronic device matches the first fingerprint data associated with the hash data 114). The security component 108 can perform learning with respect to fingerprint data explicitly or implicitly. Additionally or alternatively, the security component 108 can also employ an automatic classification system and/or an automatic classification process to facilitate determining a match between fingerprint data (e.g., determining whether the second fingerprint data provided to the second electronic device matches the first fingerprint data associated with the hash data 114). For example, the security component 108 can employ a probabilistic and/or statistical-based analysis to learn and/or generate inferences with respect to fingerprint data. The security component 108 can employ, for example, a support vector machine (SVM) classifier to learn and/or generate inferences with respect to fingerprint data. The security component 108 can employ other classification techniques associated with Bayesian networks, decision trees and/or probabilistic classification models. Classifiers employed by the security component 108 can be explicitly trained (e.g., via a generic training data) as well as implicitly trained (e.g., via observing user behavior, receiving extrinsic information). For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

In an aspect, the security component 108 can include an inference component that can further enhance automated aspects of the security component 108 utilizing in part inference-based schemes to facilitate determining a match between fingerprint data (e.g., determining whether the second fingerprint data provided to the second electronic device matches the first fingerprint data associated with the hash data 114). The security component 108 can employ any suitable machine-learning based techniques, statistical-based techniques and/or probabilistic-based techniques. For example, the security component 108 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the security component 108 can perform a set of machine learning computations associated with fingerprint data. For example, the security component 108 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations, a set of ensemble modeling computations, and/or a set of different machine learning computations.

Compared to a conventional system, the login delegation component 102 can provide improved security, reduced time, greater capabilities and/or greater adaptability for facilitating login from an alternate electronic device. Additionally, by employing the login delegation component 102, performance of an electronic device can be improved, costs associated with performing a transaction on an electronic device can be reduced, and risks associated with loss of a transaction associated with an electronic device can be minimized. Moreover, it is to be appreciated that technical features of the login delegation component 102 and management of a login process on an electronic device, etc. are highly technical in nature and not abstract ideas. Processing threads of the login delegation component 102 that process the hash data 114 cannot be performed by a human (e.g., are greater than the capability of a single human mind). For example, the amount of the hash data 114 processed, the speed of processing of the hash data 114 and/or the data types of the hash data 114 analyzed by the login delegation component 102 over a certain period of time can be respectively greater, faster and different than the amount, speed and data type that can be processed by a single human mind over the same period of time. Furthermore, the hash data 114 analyzed by the login delegation component 102 can be encoded data and/or compressed data associated with an electronic device. Moreover, the login delegation component 102 can be fully operational towards performing one or more other functions (e.g., fully powered on, fully executed, etc.) while also analyzing the hash data 114.

While FIG. 1 depicts separate components in the login delegation component 102, it is to be appreciated that two or more components may be implemented in a common component. Further, it can be appreciated that the design of system 100 and/or the login delegation component 102 can include other component selections, component placements, etc., to facilitate login from an alternate electronic device.

Figure 2:
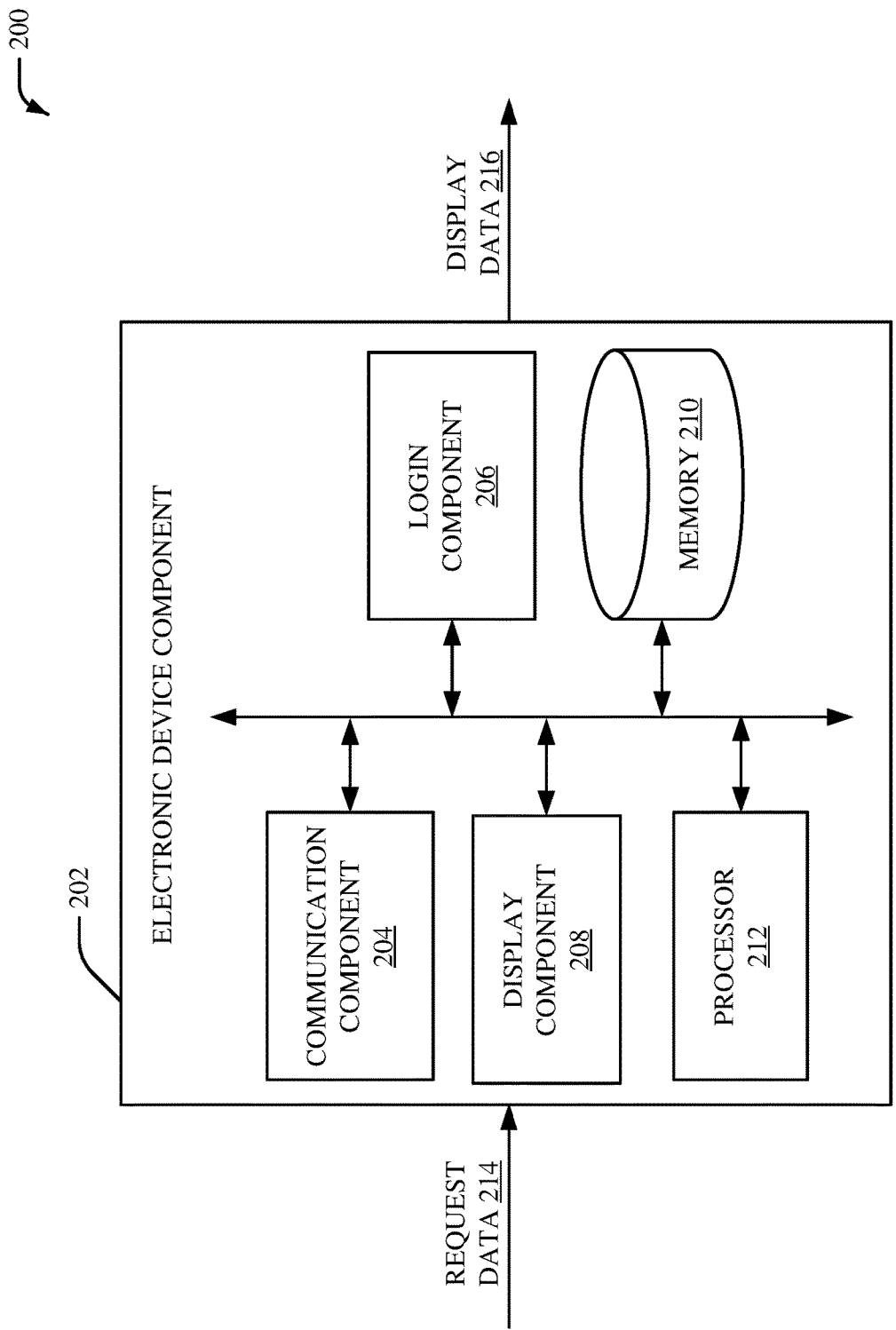
FIG. 2 illustrates a block diagram of an example, non-limiting system that includes an electronic device component in accordance with one or more embodiments described herein.

FIG. 2 illustrates an example, non-limiting system 200 in accordance with one or more embodiments described herein. Repetitive description of like elements employed in other embodiments described herein is omitted for sake of brevity.

The system 200 can be implemented on or in connection with an electronic device associated with an enterprise application. For instance, the system 200 can be implemented on or in connection with the second electronic device. The system 200 can be employed by various systems, such as, but not limited to transaction systems, payment systems, online transaction systems, online payment systems, server systems, electronic device systems, mobile device systems, smartphone systems, virtual machine systems, consumer service systems, security systems, encryption systems, cryptography systems, hash generation systems, mobile application systems, login systems, financial systems, digital systems, machine learning systems, artificial intelligence systems, neural network systems, network systems, computer network systems, communication systems, enterprise systems, and the like. In one example, the system 200 can be associated with a PaaS and/or a transaction system. Moreover, the system 200 and/or the components of the system 200 can be employed to use hardware and/or software to solve problems that are highly technical in nature (e.g., related to encryption, related to cryptography, related to digital data processing, related to electronic devices, etc.), that are not abstract and that cannot be performed as a set of mental acts by a human.

The system 200 includes an electronic device component 202. In FIG. 2, the electronic device component 202 can include a communication component 204, a login component 206, and/or a display component 208. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 200 (e.g., the electronic device component 202) can include memory 210 for storing computer executable components and instructions. The system 200 (e.g., the electronic device component 202) can further include a processor 212 to facilitate operation of the instructions (e.g., computer executable components and instructions) by the system 200 (e.g., the electronic device component 202).

The electronic device component 202 (e.g., the communication component 204 of the electronic device component 202) can receive request data 214. The request data 214 can include a request for a terminal computing session associated with a user identity for an alternate electronic device (e.g., the first electronic device). In an embodiment, the communication component 204 can receive the request data 214 from a server. For example, the communication component 204 can receive the request data 214 from the communication component 104 of the login delegation component 102. In certain embodiments, the communication component 204 can provide a communication to the server (e.g., the communication component 104 of the login delegation component 102) to confirm that an electronic device (e.g., the second electronic device) associated with the electronic device component 202 will allow a user identity associated with another electronic device (e.g., the first electronic device) to access a graphical user interface via the electronic device (e.g., the second electronic device) associated with the electronic device component 202. In certain embodiments, the communication component 204 can additionally or alternatively provide a communication to the server (e.g., the communication component 104 of the login delegation component 102) to request a type of application program to render via a graphical user interface on the electronic device (e.g., the second electronic device) associated with the electronic device component 202.

The login component 206 can manage login of a user identity to an electronic device (e.g., the second electronic device) associated with the electronic device component 202. For example, the login component 206 can manage a terminal computing process performed on an electronic device (e.g., the second electronic device) associated with the electronic device component 202. In an aspect, the login component 206 can perform a process to facilitate a correlation with an alternate electronic device (e.g., the first electronic device). For example, the login component 206 can determine location data associated with the electronic device (e.g., the second electronic device) associated with the electronic device component 202. In another aspect, the login component 206 can additionally or alternatively initiate display of a graphical user interface on the electronic device (e.g., the second electronic device) associated with the electronic device component 202.

In yet another aspect, the login component 206 can additionally or alternatively provide a communication to a virtual machine to initiate the virtual machine to display a graphical user interface on the electronic device (e.g., the second electronic device) associated with the electronic device component 202. The login component 206 can additionally or alternatively execute a transaction related to a user identity associated with an alternate electronic device (e.g., the first electronic device) via the graphical user interface on the electronic device (e.g., the second electronic device) associated with the electronic device component 202. In an embodiment, the login component 206 can additionally or alternatively initiate removal of a graphical user interface on the electronic device (e.g., the second electronic device) associated with the electronic device component 202 based on time data indicative of an interval of time for the electronic device (e.g., the second electronic device) associated with the electronic device component 202 to render the graphical user interface.

The display component 208 can generate a graphical user interface, for display, that outputs a terminal computing session associated with a user identity for an alternate electronic device (e.g., the first electronic device). For instance, the display component 208 can generate display data 216 that includes one or more display elements for the graphical user interface. The graphical user interface can be in a human interpretable format. The display component 208 can display and/or facilitate display the one or more display elements associated with the terminal computing session. In an embodiment, the display component 208 can present the terminal computing session as one or more of alphanumeric characters, graphics, animations, audio and video. Furthermore, the terminal computing session can be static or updated dynamically to provide information in real-time as changes or events occur with respect to the terminal computing session. In accordance with one aspect, a display element (e.g., a graphical element) provided by the display component 208 can form all or part of a display rendered on the alternate electronic device (e.g., the first electronic device).

In an implementation, the display component 208 can generate a notification associated with the terminal computing session, a message associated with the terminal computing session, an icon associated with the terminal computing session, a thumbnail associated with the terminal computing session, a dialog box associated with the terminal computing session, a tool associated with the terminal computing session, a widget associated with the terminal computing session, an application programming interface associated with the terminal computing session, and/or another display element associated with the terminal computing session. A display element associated with the terminal computing session can be transparent, translucent or opaque. A display element associated with the terminal computing session can also be various sizes, various colors, various brightness, and so forth as well as being animated (e.g., for fading in and out, etc.).

While FIG. 2 depicts separate components in the electronic device component 202, it is to be appreciated that two or more components may be implemented in a common component. Further, it can be appreciated that the design of system 200 and/or the electronic device component 202 can include other component selections, component placements, etc., to facilitate login to an electronic device.

Figure 3:
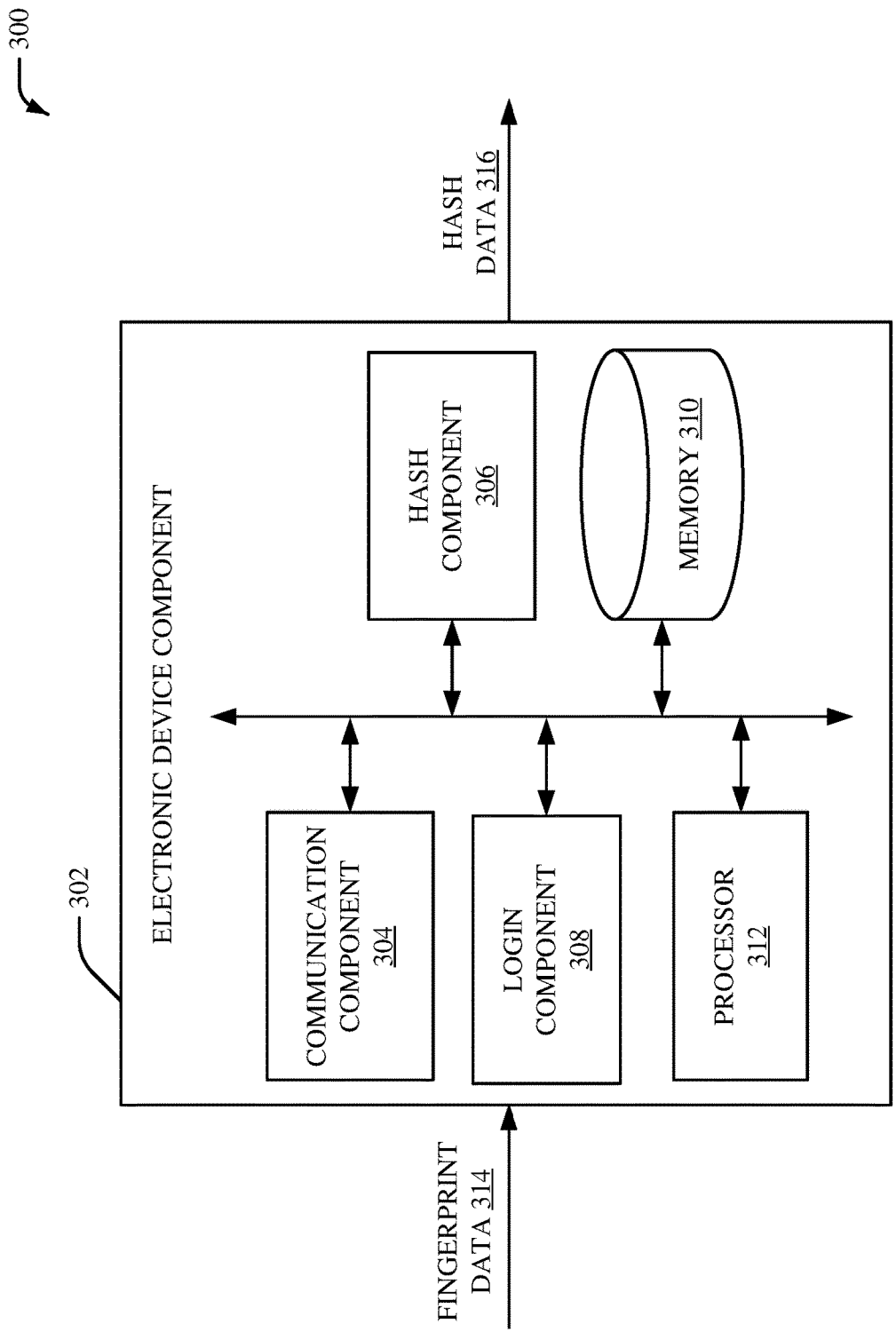
FIG. 3 illustrates a block diagram of another example, non-limiting system that includes an electronic device component in accordance with one or more embodiments described herein.

FIG. 3 illustrates an example, non-limiting system 300 in accordance with one or more embodiments described herein. Repetitive description of like elements employed in other embodiments described herein is omitted for sake of brevity. The system 300 can be implemented on or in connection with an electronic device associated with an enterprise application. For instance, the system 300 can be implemented on or in connection with the first electronic device. The system 300 can be employed by various systems, such as, but not limited to transaction systems, payment systems, online transaction systems, online payment systems, server systems, electronic device systems, mobile device systems, smartphone systems, virtual machine systems, consumer service systems, security systems, encryption systems, cryptography systems, hash generation systems, mobile application systems, login systems, financial systems, digital systems, machine learning systems, artificial intelligence systems, neural network systems, network systems, computer network systems, communication systems, enterprise systems, and the like. In one example, the system 300 can be associated with a PaaS and/or a transaction system. Moreover, the system 300 and/or the components of the system 300 can be employed to use hardware and/or software to solve problems that are highly technical in nature (e.g., related to encryption, related to cryptography, related to digital data processing, related to electronic devices, etc.), that are not abstract and that cannot be performed as a set of mental acts by a human.

The system 300 includes an electronic device component 302. In FIG. 3, the electronic device component 302 can include a communication component 304, a hash component 306, and/or a login component 308. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 300 (e.g., the electronic device component 302) can include memory 310 for storing computer executable components and instructions. The system 300 (e.g., the electronic device component 302) can further include a processor 312 to facilitate operation of the instructions (e.g., computer executable components and instructions) by the system 300 (e.g., the electronic device component 302).

The electronic device component 302 (e.g., the communication component 304 of the electronic device component 302) can receive fingerprint data 314. The fingerprint data 314 can be an encrypted version of a fingerprint of a user (e.g., a user identity) associated with an electronic device (e.g., the first electronic device) associated with the electronic device component 302. Furthermore, the fingerprint data 314 can be employed to verify the user and/or to log the user into the electronic device (e.g., the first electronic device) associated with the electronic device component 302. As such, the fingerprint data 314 can be biometric data for the user (e.g., the user identity) related to the electronic device (e.g., the first electronic device) associated with the electronic device component 302. In an embodiment, the fingerprint data 314 can be generated by an operating system of the electronic device (e.g., the first electronic device) associated with the electronic device component 302. In another embodiment, the fingerprint data 314 can be received from a hardware chip of the electronic device (e.g., the first electronic device) associated with the electronic device component 302. For example, the hardware chip can be a secure enclave hardware chip that is isolated from a central processing unit of the electronic device (e.g., the first electronic device) associated with the electronic device component 302. Furthermore, the fingerprint data 314 can be protected with a key available to the hardware chip.

In another embodiment, the communication component 304 can generate and/or transmit a terminal computing request. The terminal computing request can be, for example, a request to login to an electronic device program (e.g., a system program and/or an application program) from an alternate electronic device. In one embodiment, the communication component 304 can generate the terminal computing request in response to a determination that a battery life of a battery of the electronic device (e.g., the first electronic device) associated with the electronic device component 302 satisfies a defined criterion. For example, the communication component 304 can generate the terminal computing request in response to a determination that a power level of a battery of the electronic device (e.g., the first electronic device) associated with the electronic device component 302 corresponds to a defined power level threshold value.

In another embodiment, the communication component 304 can generate the terminal computing request in response to a determination that a network condition for the electronic device (e.g., the first electronic device) associated with the electronic device component 302 satisfies a defined criterion. For example, the communication component 304 can generate the terminal computing request in response to a determination that a strength of a communication network for the electronic device (e.g., the first electronic device) associated with the electronic device component 302 corresponds to a defined signal strength threshold value. In yet another embodiment, the communication component 304 can generate the terminal computing request in response to a determination that a user initiates the terminal computing request via a graphical user interface of the electronic device (e.g., the first electronic device) associated with the electronic device component 302. For example, the communication component 304 can generate the terminal computing request in response to a determination that a command button for an application program on the electronic device (e.g., the first electronic device) associated with the electronic device component 302 is activated via a graphical user interface associated with the application program.

The hash component 306 can generate hash data 316 based on the fingerprint data 314. Additionally or alternatively, the hash component 306 can generate hash data 316 based on a timestamp associated with the terminal computing request. The timestamp can be, for example, a time associated with the terminal computing request. Alternatively, the timestamp can be an interval of time to allow an alternate electronic device to login a user identity related to the electronic device (e.g., the first electronic device) associated with the electronic device component 302. In an aspect, the hash data 316 generated by the hash component 306 can be a string of data generated by a hash function. For example, the hash data 316 can be an encrypted version of a digital data signature. In another aspect, the hash data 316 can include a time-based one-way hash (e.g., a time-based token). Furthermore, the hash data 316 can correspond to the hash data 114 provided to the login delegation component 102.

The login component 308 can manage establishment of a terminal computing session associated with the terminal computing request. For example, the login component 308 can determine accuracy of the hash data 316 after the hash data 316 is provided to a server. In certain embodiments, the login component 308 can generate a graphical user interface for the electronic device (e.g., the first electronic device) associated with the electronic device component 302 to facilitate generation of the terminal computing request. For example, the login component 308 can generate the graphical user interface for the electronic device (e.g., the first electronic device) associated with the electronic device component 302 in response to a determination that a condition associated with the electronic device satisfies a defined criterion. In certain embodiments, the login component 308 can determine and/or generate information to facilitate formation of a correlation between the electronic device and one or more electronic devices, e.g., the login component 308 can determine and/or generate device data related to the electronic device (e.g., the first electronic device) associated with the electronic device component 302. Additionally or alternatively, the login component 308 can determine and/or generate user data related to a user identity associated with the electronic device.

While FIG. 3 depicts separate components in the electronic device component 302, it is to be appreciated that two or more components may be implemented in a common component. Further, it can be appreciated that the design of system 300 and/or the electronic device component 302 can include other component selections, component placements, etc., to facilitate login to an alternate electronic device.

FIG. 4 illustrates an example, non-limiting system 400 in accordance with one or more embodiments described herein. Repetitive description of like elements employed in other embodiments described herein is omitted for sake of brevity. The system 400 includes a server 402, an electronic device 404 and/or one or more electronic devices $406_{1-N}$, where N is an integer. The server 402 can include the login delegation component 102. The electronic device 404 can include the electronic device component 302. Furthermore, the one or more electronic devices $406_{1-N}$ can respectively include the electronic device component 202. The server 402, the electronic device 404, and/or the one or more electronic devices $406_{1-N}$ can be in communication via a network 408. The network 408 can be a communication network, a wireless network, an internet protocol (IP) network, a voice over IP network, an internet telephony network, a mobile telecommunications network, a landline telephone network, a personal area network, a wired network, and/or another type of network.

In an embodiment, the electronic device 404 can correspond to the first electronic device disclosed herein. Additionally, an electronic device from the one or more electronic devices $406_{1-N}$ can correspond to the second electronic device disclosed herein. The server 402 can be, for example, a stand-alone server and/or an enterprise-class server operating a server OS such as a MICROSOFT® OS, a UNIX® OS, a LINUX® OS, and/or another suitable server-based OS. It is to be appreciated that one or more operations performed by the server 402 and/or one or more services provided by the server 402 can be combined, distributed, and/or separated for a given implementation. Furthermore, the server 402 can be associated with a transaction system, a payment system, an online transaction system, an online payment system, a time-management system, a scheduling system, an electronic calendaring system, an asset management system, a work and productivity system, an email system, a cloud storage system, a messaging system, a social networking system, a note-taking system, a word processor system, a spreadsheet system, a presentation program system, an enterprise system, and/or another type of system.

The electronic device 404 can be a client device, a user device, a mobile device, a smart device, a smart phone, a tablet device, a handheld device, a portable computing device, a wearable device, a virtual reality device, a computer, a desktop computer, a laptop computer, a POS device, and/or another type of electronic device associated with a display. Furthermore, the electronic device 404 can include one or more computing capabilities and/or one or more communication capabilities. In an aspect, the electronic device 404 can provide one or more electronic device programs, such as system programs and application programs to perform various computing and/or communications operations. Some example system programs associated with the electronic device 404 can include, without limitation, an operating system (e.g., MICROSOFT® OS, UNIX® OS, LINUX® OS, Symbian OS™, Embedix OS, BREW OS, JavaOS, a WAP OS, and others), device drivers, programming tools, utility programs, software libraries, APIs, and so forth. Some example application programs associated with the electronic device 404 can include, without limitation, a web browser application, a transaction application, a messaging application (e.g., e-mail, IM, SMS, MMS, telephone, voicemail, VoIP, video messaging, IRC), a contacts application, a calendar application, an electronic document application, a database application, a media application (e.g., music, video, television), a LBS application (e.g., GPS, mapping, directions, positioning systems, geolocation, point-of-interest, locator) that may utilize hardware components such as an antenna, and so forth. One or more of the electronic device programs associated with the electronic device 404 can display a graphical user interface to present information to and/or receive information from one or more users of the electronic device 404. In some embodiments, the electronic device programs of the electronic device 404 can include one or more applications configured to conduct some or all of the functionalities and/or processes discussed herein. In an embodiment, an application program of the electronic device 404 can be related to a transaction system, a payment system, an online transaction system, an online payment system, a time-management system, a scheduling system, an electronic calendaring system, an asset management system, a work and productivity system, an email system, a cloud storage system, a messaging system, a social networking system, a note-taking system, a word processor system, a spreadsheet system, a presentation program system, an enterprise system, and/or another type of system associated with the server 402.

The one or more electronic devices $406_{1-N}$ can be one or more client devices, one or more user devices, one or more mobile devices, one or more smart devices, one or more smart phones, one or more tablet devices, one or more handheld devices, one or more portable computing devices, one or more wearable devices, one or more virtual reality devices, one or more computers, one or more desktop computers, one or more laptop computers, one or more POS devices, and/or one or more other types of electronic devices associated with a display. Furthermore, the one or more electronic devices $406_{1-N}$ can respectively include one or more computing capabilities and/or one or more communication capabilities. In an aspect, the one or more electronic devices $406_{1-N}$ can respectively provide one or more electronic device programs, such as system programs and application programs to perform various computing and/or communications operations. Some example system programs associated with the one or more electronic devices $406_{1-N}$ can include, without limitation, an operating system (e.g., MICROSOFT® OS, UNIX® OS, LINUX® OS, Symbian OS™, Embedix OS, BREW OS, JavaOS, a WAP OS, and others), device drivers, programming tools, utility programs, software libraries, APIs, and so forth. Some example application programs associated with the one or more electronic devices $406_{1-N}$ can include, without limitation, a web browser application, a transaction application, a messaging application (e.g., e-mail, IM, SMS, MIMS, telephone, voice-mail, VoIP, video messaging, IRC), a contacts application, a calendar application, an electronic document application, a database application, a media application (e.g., music, video, television), a LBS application (e.g., GPS, mapping, directions, positioning systems, geolocation, point-of-interest, locator) that may utilize hardware components such as an antenna, and so forth.

One or more of the electronic device programs associated with the one or more electronic devices $406_{1-N}$ can display a graphical user interface to present information to and/or receive information from one or more users of the electronic device 404. In some embodiments, the electronic device programs associated with the one or more electronic devices $406_{1-N}$ can include one or more applications configured to conduct some or all of the functionalities and/or processes discussed herein. In an embodiment, an application program associated with the one or more electronic devices $406_{1-N}$ can be related to a transaction system, a payment system, an online transaction system, an online payment system, a time-management system, a scheduling system, an electronic calendaring system, an asset management system, a work and productivity system, an email system, a cloud storage system, a messaging system, a social networking system, a note-taking system, a word processor system, a spreadsheet system, a presentation program system, an enterprise system, and/or another type of system associated with the server 402.

In an embodiment, the server 402 that includes the login delegation component 102 can receive the hash data 114 via the network 408. For example, the server 402 that includes the login delegation component 102 can receive the hash data 114 (e.g., the hash data 316) from the electronic device 404 that includes the electronic device component 302. Furthermore, the server 402 that includes the login delegation component 102 can transmit the login data 116 to the one or more electronic devices $406_{1-N}$ that include the electronic device component 202. In another embodiment, the one or more electronic devices $406_{1-N}$ that include the electronic device component 202 can receive the request data 214 via the network 408. For example, the one or more electronic devices $406_{1-N}$ that include the electronic device component 202 can receive the request data 214 from the server 402 and/or the electronic device 404. As such, the server 402, the electronic device 404 and/or the one or more electronic devices $406_{1-N}$ can interact via the network 408 to facilitate login from an alternate electronic device and/or execution of a transaction via an alternate electronic device. Moreover, with the system 400, a computing experience associated with an electronic device 404 can be improved. Furthermore, one or more limitations of the electronic device 404 (e.g., limited battery life of the electronic device 404, service limitations of the electronic device 404, etc.) can be circumvented. Security associated with a transaction executed on the one or more electronic devices $406_{1-N}$ can also be improved. Additionally, with the system 400, reliability of execution of a transaction by the server 402 can be improved.

In a non-limiting example, a user associated with the electronic device $406_1$ can traveling to a different geographic location (e.g., a different country, a different city, a different state, etc.). Furthermore, the user associated with the electronic device $406_1$ can know information regarding the different geographic location and/or a geofence associated with the different geographic location. For example, the user associated with the electronic device $406_1$ can know coordinates of an airport associated with the different geographic location and a time when the user will be arriving at the airport. The user associated with the electronic device $406_1$ can also know that internet service and/or service provider connectivity for the electronic device $406_1$ will be lost upon arrival to the different geographic location. Therefore, the user associated with the electronic device $406_1$ can generate a request to delegate a one-time login to a secondary device available to the different geographic location at the future time. The login delegation component 102 of the server 402 can also initiate generation of a signal to a secondary device (e.g., the electronic device 404) at the different geographic location at the future time to facilitate alternate login from secondary device (e.g., the electronic device 404) and/or execution of a transaction via the secondary device (e.g., the electronic device 404). In certain embodiments, if the user associated with the electronic device $406_1$ does not login from any secondary device (e.g., the electronic device 404) during a certain future time range, then the one-time login request can be deleted from the server 402.

Figure 5:
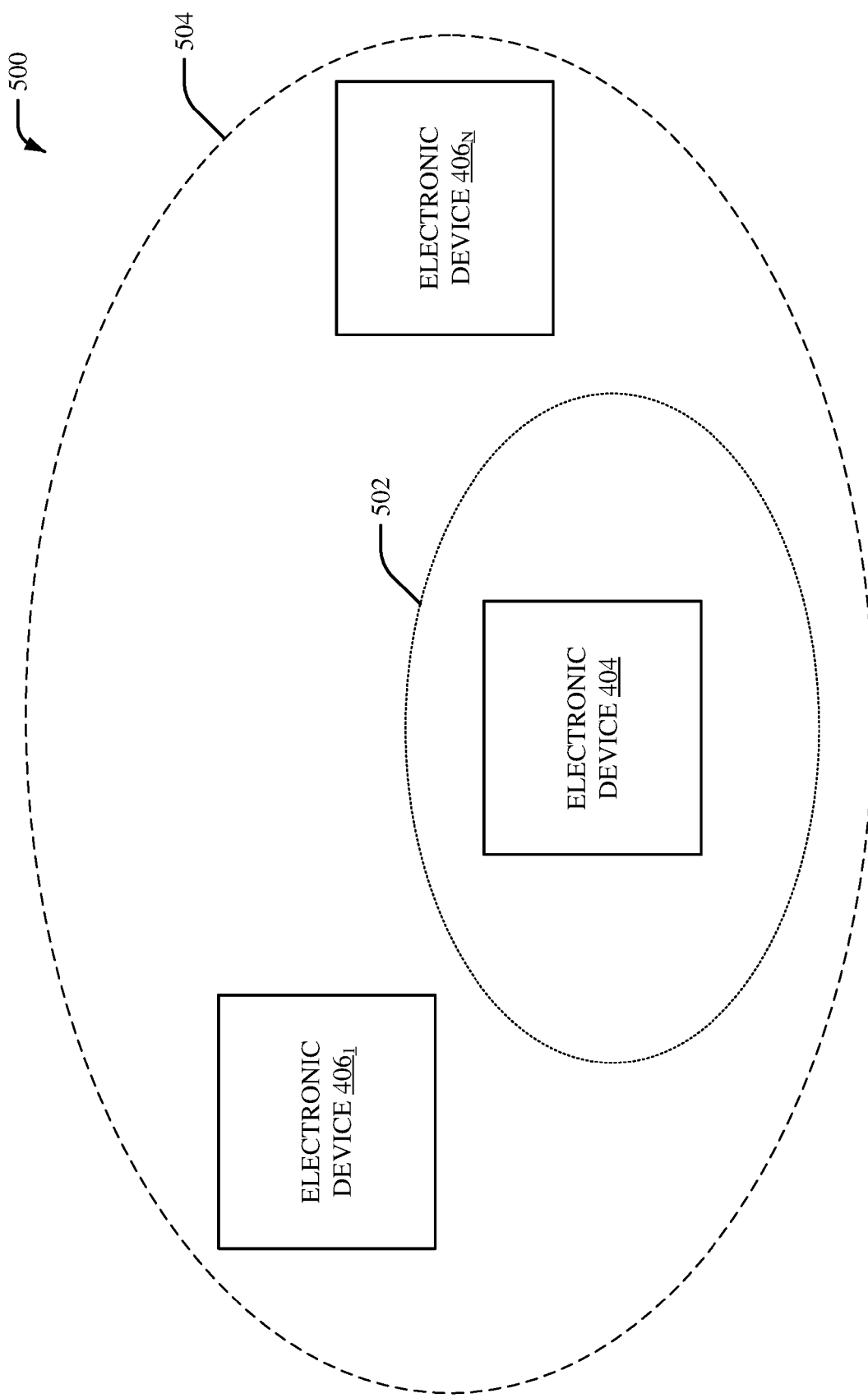
FIG. 5 illustrates an example, non-limiting system associated with electronic devices in accordance with one or more embodiments described herein.

FIG. 5 illustrates an example, non-limiting system 500 in accordance with one or more embodiments described herein. Repetitive description of like elements employed in other embodiments described herein is omitted for sake of brevity. The system 500 includes the electronic device 404 and the one or more electronic devices $406_{1-N}$. In an embodiment, the electronic device 404 can include the electronic device component 302 and the one or more electronic devices $406_{1-N}$ can respectively include the electronic device component 202. In an aspect, the electronic device 404 can be associated with a geographic area 502 and/or a geographic area 504. The geographic area 502 can be, for example, a first geographic area associated with a first wireless technology standard. Furthermore, the geographic area 504 can be, for example, a second geographic area associated with a second wireless technology standard. For instance, the geographic area 502 can be associated with a wireless protocol such as Bluetooth®, Bluetooth low Energy®, near-field communication (NFC), and/or the like. Furthermore, the geographic area 504 can be associated with a wireless protocol (e.g., WiFi, LAN, wireless LAN, etc.), a public switched telephone network (PSTN), a cellular protocol, a combination thereof, and/or the like. In certain embodiments, the geographical area 502 and/or the geographical area 504 can be associated with global positioning system coordinates. Additionally or alternatively, in certain embodiments, the geographical area 502 and/or the geographical area 504 can be determined by one or more sensors such as, but not limited to, one or more accelerometers, one or more gyroscopes, one or more cameras, and/or one or more other sensors. For example, a direction obtained by the one or more sensors, a speed obtained by the one or more sensors, one or more images captured by the one or more sensors, and/or one or more videos captured by the one or more sensors can additionally or alternatively be employed to determine the geographical area 502 and/or the geographical area 504.

The geographic area 502 and/or the geographic are 504 can serve, for example, as a geofence around the electronic device 404. For example, the geographic area 502 can be associated with a certain distance and/or communication range around the electronic device 404. Furthermore, the geographic area 504 can be associated with a certain distance and/or communication range around the electronic device 404 that is different than the geographic area 502. In certain embodiments, the geographic area 502 can include one or more other electronic devices associated with a user identity related to the electronic device 404. For example, in certain embodiments, the geographic area 502 can include the electronic device 404 and another electronic device (e.g., a smartwatch, a virtual reality headset, etc.) with a corresponding user identity. In an embodiment, the other electronic device (e.g., the smartwatch, the virtual reality headset, etc.) with the corresponding user identity can be employed as a secondary device to provide temporary access to user information for processing a transaction.

Figure 6:
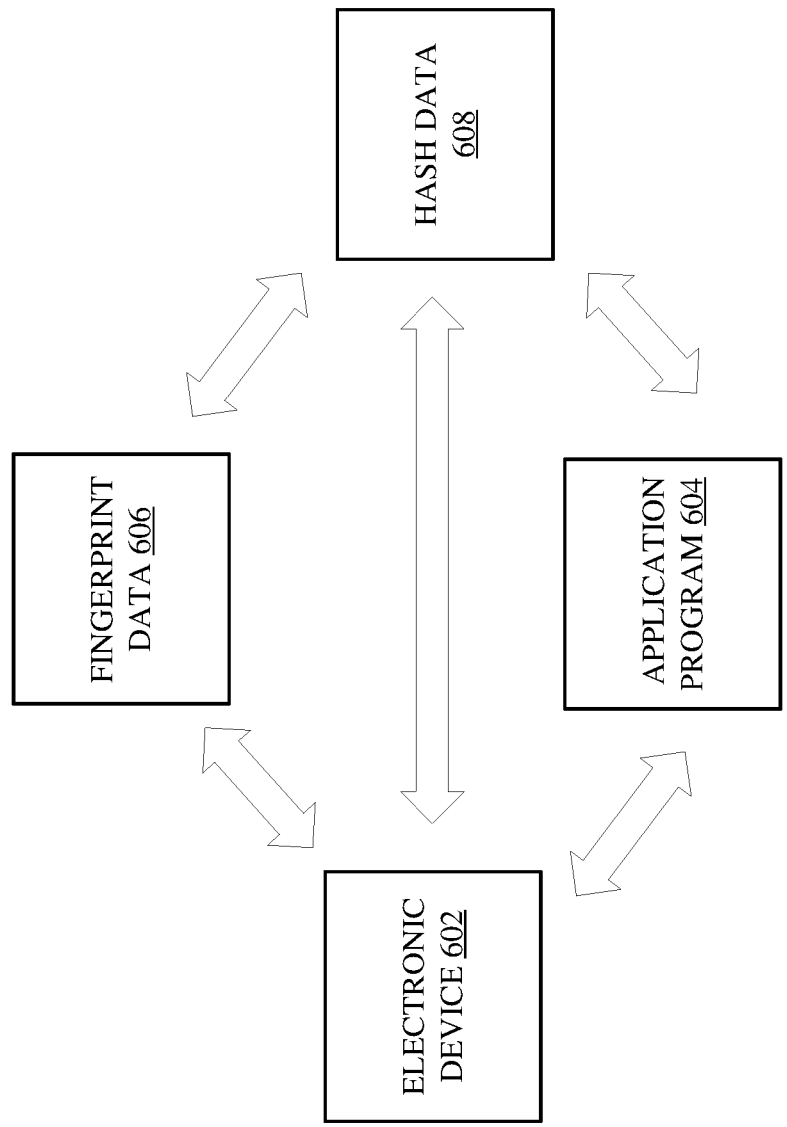
FIG. 6 illustrates an example, non-limiting system associated with generating hash data in accordance with one or more embodiments described herein.

FIG. 6 illustrates an example, non-limiting system 600 in accordance with one or more embodiments described herein. Repetitive description of like elements employed in other embodiments described herein is omitted for sake of brevity. The system 600 includes an electronic device 602, an application program 604, fingerprint data 606 and/or hash data 608. The electronic device 602 can correspond to the first electronic device (e.g., the electronic device 404) that generates and/or provides the terminal computing request. The electronic device 602 can include the application program 604. In certain embodiments, the application program 604 can include at least a portion of the electronic device component 302. The application program 604 can be, for example, a software mobile application related to a transaction system, a payment system, an online transaction system, an online payment system, a time-management system, a scheduling system, an electronic calendaring system, an asset management system, a work and productivity system, an email system, a cloud storage system, a messaging system, a social networking system, a note-taking system, a word processor system, a spreadsheet system, a presentation program system, an enterprise system, and/or another type of system. In an embodiment, a transaction can be initiated and/or in progress via the application program 604.

However, in response to a determination that a condition associated with the electronic device 602 satisfies a defined criterion, a terminal computing request can be generated by the electronic device 602 and/or the hash data 608 can be generated. The hash data 608 can be generated based on the fingerprint data 606. Additionally or alternatively, the hash data 608 can be generated based on a timestamp associated with the terminal computing request related to the application program 604. The fingerprint data 606 can be an encrypted version of a fingerprint of a user (e.g., a user identity) associated with the application program 604. For instance, the user (e.g., the user identity) can be a user associated the transaction initiated and/or in progress via the application program 604. Furthermore, the fingerprint data 606 can be employed to verify the user and/or to log the user into the electronic device 602. As such, the fingerprint data 606 can be biometric data for the user (e.g., the user identity) related to the application program 604. In an embodiment, the fingerprint data 606 can be generated by an operating system of the electronic device 602. In another embodiment, the fingerprint data 606 can be received from a hardware chip of the electronic device 602. For example, the hardware chip can be a secure enclave hardware chip that is isolated from a central processing unit of the electronic device 602.

Additionally, the hash data 608 can be a string of data generated by a hash function. For example, the hash data 608 can be an encrypted version of a digital data signature. In another aspect, the hash data 608 can include a time-based one-way hash (e.g., a time-based token). In an embodiment, the hash data 608 can correspond to the hash data 114 and/or the hash data 316. In certain embodiments, the hash data 608 can facilitate login to an alternate electronic device. For example, the hash data 608 can facilitate login to an alternate electronic device (e.g., the one or more electronic devices $406_{1-N}$) to complete the transaction initiated and/or in progress via the application program 604.

Figure 7:
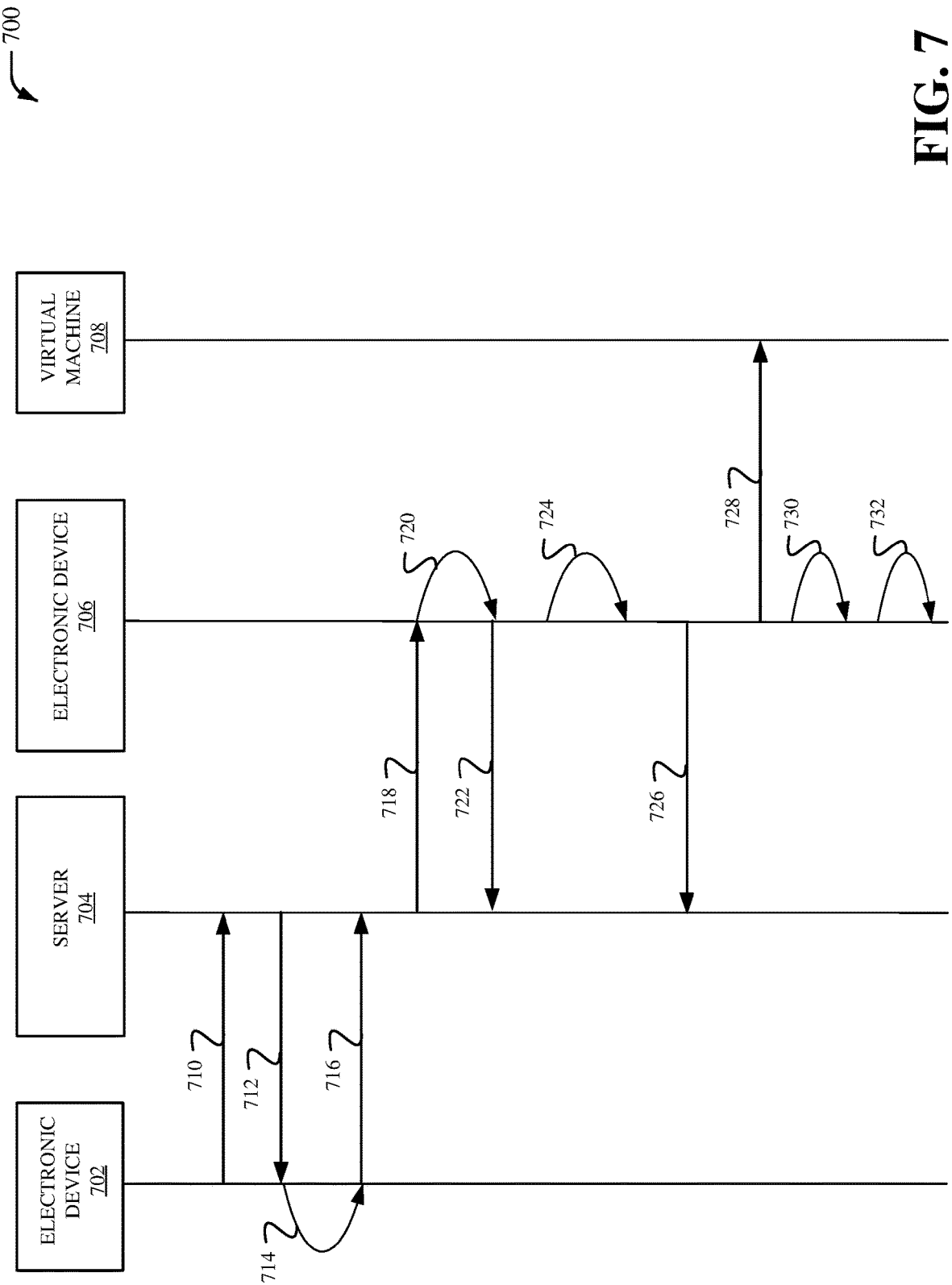
FIG. 7 illustrates an example, non-limiting system for facilitating login from an alternate electronic device in accordance with one or more embodiments described herein.

FIG. 7 illustrates an example, non-limiting system 700 in accordance with one or more embodiments described herein. Repetitive description of like elements employed in other embodiments described herein is omitted for sake of brevity. The system 700 includes an electronic device 702, a server 704, an electronic device 706 and/or a virtual machine 708. The electronic device 702 can correspond to the first electronic device such as the electronic device 404 and/or the electronic device 602, for example. Furthermore, the electronic device 702 can include the electronic device component 302. The server 704 can correspond to the server 402, for example. Furthermore, the server 704 can include the login delegation component 102. The electronic device 706 can correspond to the second electronic device such as the electronic device $406_1$ and/or another electronic device from the one or more electronic devices $406_{1-N}$, for example. Furthermore, the electronic device 706 can include the electronic device component 202. The virtual machine 708 can be an emulation of a computing environment. For example, the virtual machine 708 can be an emulation of an application program such as the application program 604, for example. The virtual machine 708 can be configured to provide a graphical user interface associated with the server 704. For example, the virtual machine 708 can be configured to provide a graphical user interface associated with a transaction system, a payment system, an online transaction system, an online payment system, a time-management system, a scheduling system, an electronic calendaring system, an asset management system, a work and productivity system, an email system, a cloud storage system, a messaging system, a social networking system, a note-taking system, a word processor system, a spreadsheet system, a presentation program system, an enterprise system, and/or another type of system associated with the server 704.

In an embodiment, the electronic device 702 can provide a communication 710 to the server 704. The communication 710 can be, for example, a communication that includes hash data. For example, the communication 710 can include the hash data 114. In response to the communication 710, the server 704 can provide a communication 712. The communication 712 can be, for example, a communication that includes a confirmation of receival of the hash data and/or a request for confirmation of accuracy of the hash data. In an embodiment, in response to the communication 712, the electronic device 702 can perform a process 714 to determine accuracy of the hash data provided to the server 704. In response to the communication 712 and/or the process 714, the electronic device 702 can provide a communication 716. The communication 716 can be, for example, a communication that includes a confirmation of accuracy of the hash data. In another embodiment, the server 704 can provide a communication 718 to the electronic device 706. The communication 718 can be, for example, a message to the electronic device 706 to allow the display of a graphical user interface on the electronic device 706. For example, the communication 718 can include a request to a user identity associated with the electronic device 702 to employ a graphical user interface via the electronic device 706. In response to the communication 718, the electronic device 706 can perform a process 720 to form a correlation with the electronic device 702, in certain embodiments. In response to the communication 718 and/or the process 720, the electronic device 706 can provide a communication 722 to the server 704. The communication 722 can be, for example, a communication that confirms that the electronic device 706 will allow a user identity associated with the electronic device 702 to access a graphical user interface via the electronic device 706.

In yet another embodiment, the electronic device 706 can perform a process 724. For example, the process 724 can determine whether to allow a user identity to access the electronic device 706 based on a comparison between fingerprint data provided to the electronic device 706 and fingerprint data included in the hash data associated with the communication 710. In an implementation, the electronic device 706 can provide a communication 726 to the server 704. The communication 726 can be, for example, a communication that requests indication of a type of application program to render via a graphical user interface on the electronic device 706. In yet another embodiment, the electronic device 706 can provide a communication 728 to the virtual machine 708. The communication 728 can be, for example, a communication that initiates the virtual machine 708 to display a graphical user interface on the electronic device 706. In yet another embodiment, the electronic device 706 can perform a process 730. For example, the process 730 can execute a transaction related to a user identity associated with the electronic device 702. In yet another embodiment, the electronic device 706 can perform a process 732. For example, the process 732 can initiate removal of a graphical user interface on the electronic device 706 based on time data indicative of an interval of time for the electronic device 706 to render the graphical user interface.

Figure 8:
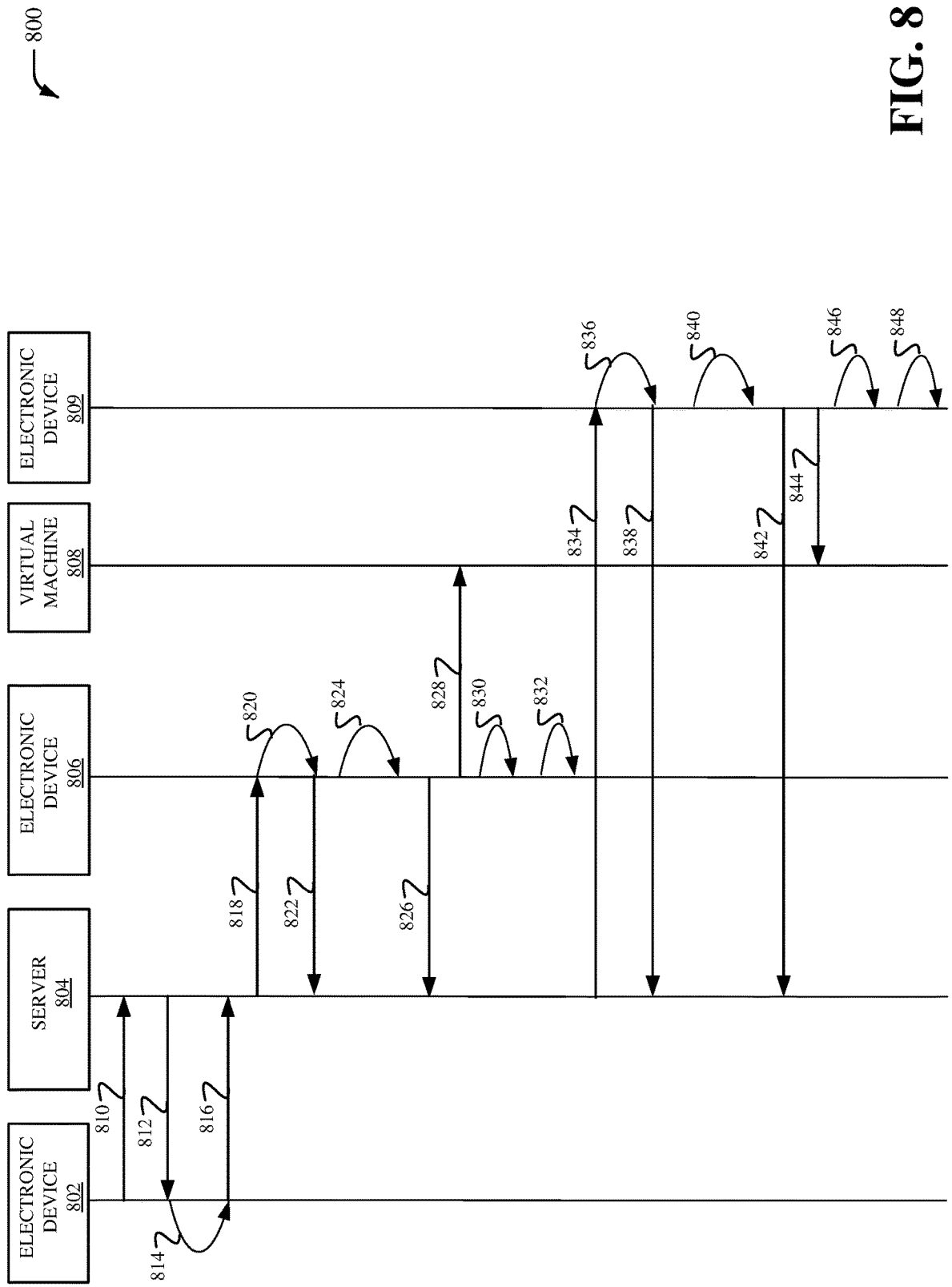
FIG. 8 illustrates another example, non-limiting system facilitating login from an alternate electronic device in accordance with one or more embodiments described herein.

FIG. 8 illustrates an example, non-limiting system 800 in accordance with one or more embodiments described herein. Repetitive description of like elements employed in other embodiments described herein is omitted for sake of brevity. The system 800 includes an electronic device 802, a server 804, an electronic device 806, a virtual machine 808 and/or an electronic device 809. The system 800 can be, for example, an embodiment where multiple electronic devices support an electronic device associated with a terminal computing request. The electronic device 802 can correspond to the first electronic device such as the electronic device 404 and/or the electronic device 602, for example. Furthermore, the electronic device 802 can include the electronic device component 302. The server 804 can correspond to the server 402, for example. Furthermore, the server 804 can include the login delegation component 102. The electronic device 806 can correspond to the second electronic device such as the electronic device $406_1$ and/or another electronic device from the one or more electronic devices $406_{1-N}$, for example. Furthermore, the electronic device 806 can include the electronic device component 202. The virtual machine 808 can be an emulation of a computing environment. For example, the virtual machine 808 can be an emulation of an application program such as the application program 604, for example. The virtual machine 808 can be configured to provide a graphical user interface associated with the server 804. For example, the virtual machine 808 can be configured to provide a graphical user interface associated with a transaction system, a payment system, an online transaction system, an online payment system, a time-management system, a scheduling system, an electronic calendaring system, an asset management system, a work and productivity system, an email system, a cloud storage system, a messaging system, a social networking system, a note-taking system, a word processor system, a spreadsheet system, a presentation program system, an enterprise system, and/or another type of system associated with the server 804. The electronic device 809 can correspond to a third electronic device such as the electronic device $406_N$ and/or another electronic device from the one or more electronic devices $406_{1-N}$, for example. Furthermore, the electronic device 809 can include the electronic device component 202.

In an embodiment, the electronic device 802 can provide a communication 810 to the server 804. The communication 810 can be, for example, a communication that includes hash data. For example, the communication 810 can include the hash data 114. In response to the communication 810, the server 804 can provide a communication 812. The communication 812 can be, for example, a communication that includes a confirmation of receival of the hash data and/or a request for confirmation of accuracy of the hash data. In an embodiment, in response to the communication 812, the electronic device 802 can perform a process 814 to determine accuracy of the hash data provided to the server 804. In response to the communication 812 and/or the process 814, the electronic device 802 can provide a communication 816. The communication 816 can be, for example, a communication that includes a confirmation of accuracy of the hash data. In another embodiment, the server 804 can provide a communication 818 to the electronic device 806. The communication 818 can be, for example, a message to the electronic device 806 to allow the display of a graphical user interface on the electronic device 806. For example, the communication 818 can include a request for a user identity associated with the electronic device 802 to employ a graphical user interface via the electronic device 806. In response to the communication 818, the electronic device 806 can perform a process 820 to form a correlation with the electronic device 802, in certain embodiments. In response to the communication 818 and/or the process 820, the electronic device 806 can provide a communication 822 to the server 804. The communication 822 can be, for example, a communication that confirms that the electronic device 806 will allow a user identity associated with the electronic device 802 to access a graphical user interface via the electronic device 806.

In yet another embodiment, the electronic device 806 can perform a process 824. For example, the process 824 can determine whether to allow a user identity to access the electronic device 806 based on a comparison between fingerprint data provided to the electronic device 806 and fingerprint data included in the hash data associated with the communication 810. In yet another embodiment, the electronic device 806 can provide a communication 826 to the server 804. The communication 826 can be, for example, a communication that requests indication of a type of application program to render via a graphical user interface on the electronic device 806. In yet another embodiment, the electronic device 806 can provide a communication 828 to the virtual machine 808. The communication 828 can be, for example, a communication that initiates the virtual machine 808 to display a graphical user interface on the electronic device 806. In yet another embodiment, the electronic device 806 can perform a process 830. For example, the process 830 can execute a transaction related to a user identity associated with the electronic device 802. In yet another embodiment, the electronic device 806 can perform a process 832. For example, the process 832 can initiate removal of a graphical user interface on the electronic device 806 based on time data indicative of an interval of time for the electronic device 806 to render the graphical user interface.

Additionally, in certain embodiments, the server 804 can provide a communication 834 to the electronic device 809. The communication 834 can be, for example, a message to the electronic device 809 to allow the display of a graphical user interface on the electronic device 809. For example, the communication 834 can include a request for a user identity associated with the electronic device 802 to employ a graphical user interface via the electronic device 809. In response to the communication 834, the electronic device 809 can perform a process 836 to form a correlation with the electronic device 802, in certain embodiments. In response to the communication 834 and/or the process 836, the electronic device 809 can provide a communication 838 to the server 804. The communication 838 can be, for example, a communication that confirms that the electronic device 809 will allow a user identity associated with the electronic device 802 to access a graphical user interface via the electronic device 809. In yet another embodiment, the electronic device 809 can perform a process 840. For example, the process 840 can determine whether to allow a user identity to access the electronic device 809 based on a comparison between fingerprint data provided to the electronic device 809 and fingerprint data included in the hash data associated with the communication 810. In yet another embodiment, the electronic device 809 can provide a communication 842 to the server 804. The communication 842 can be, for example, a communication that requests indication of a type of application program to render via a graphical user interface on the electronic device 809. In yet another embodiment, the electronic device 809 can provide a communication 844 to the virtual machine 808. The communication 844 can be, for example, a communication that initiates the virtual machine 808 to display a graphical user interface on the electronic device 809. In yet another embodiment, the electronic device 809 can perform a process 846. For example, the process 846 can execute a transaction related to a user identity associated with the electronic device 802. In yet another embodiment, the electronic device 809 can perform a process 848. For example, the process 848 can initiate removal of a graphical user interface on the electronic device 809 based on time data indicative of an interval of time for the electronic device 809 to render the graphical user interface.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
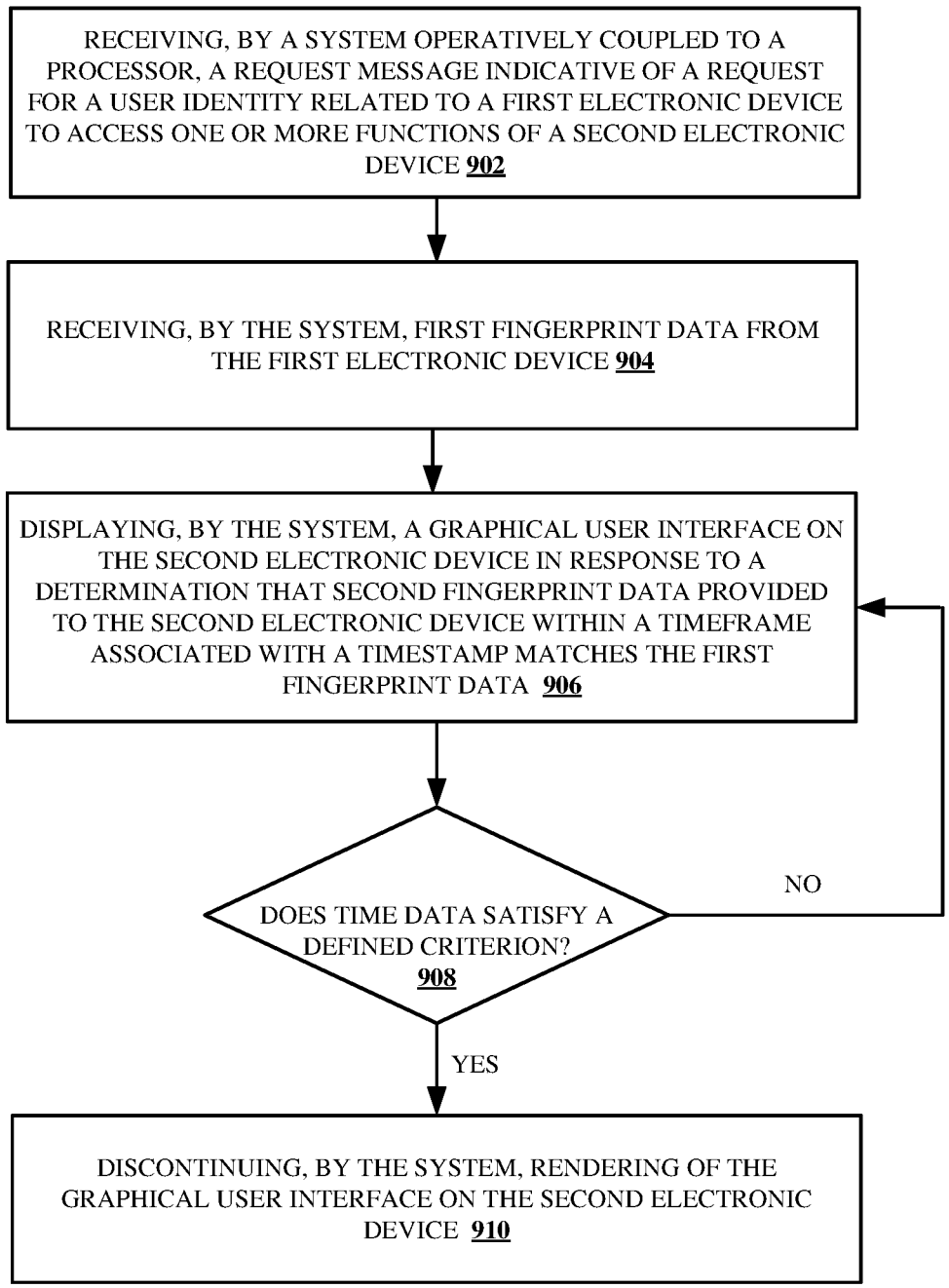
FIG. 9 illustrates a flow diagram of an example, non-limiting method for providing login from an alternate electronic device in accordance with one or more embodiments described herein.
Figure 10:
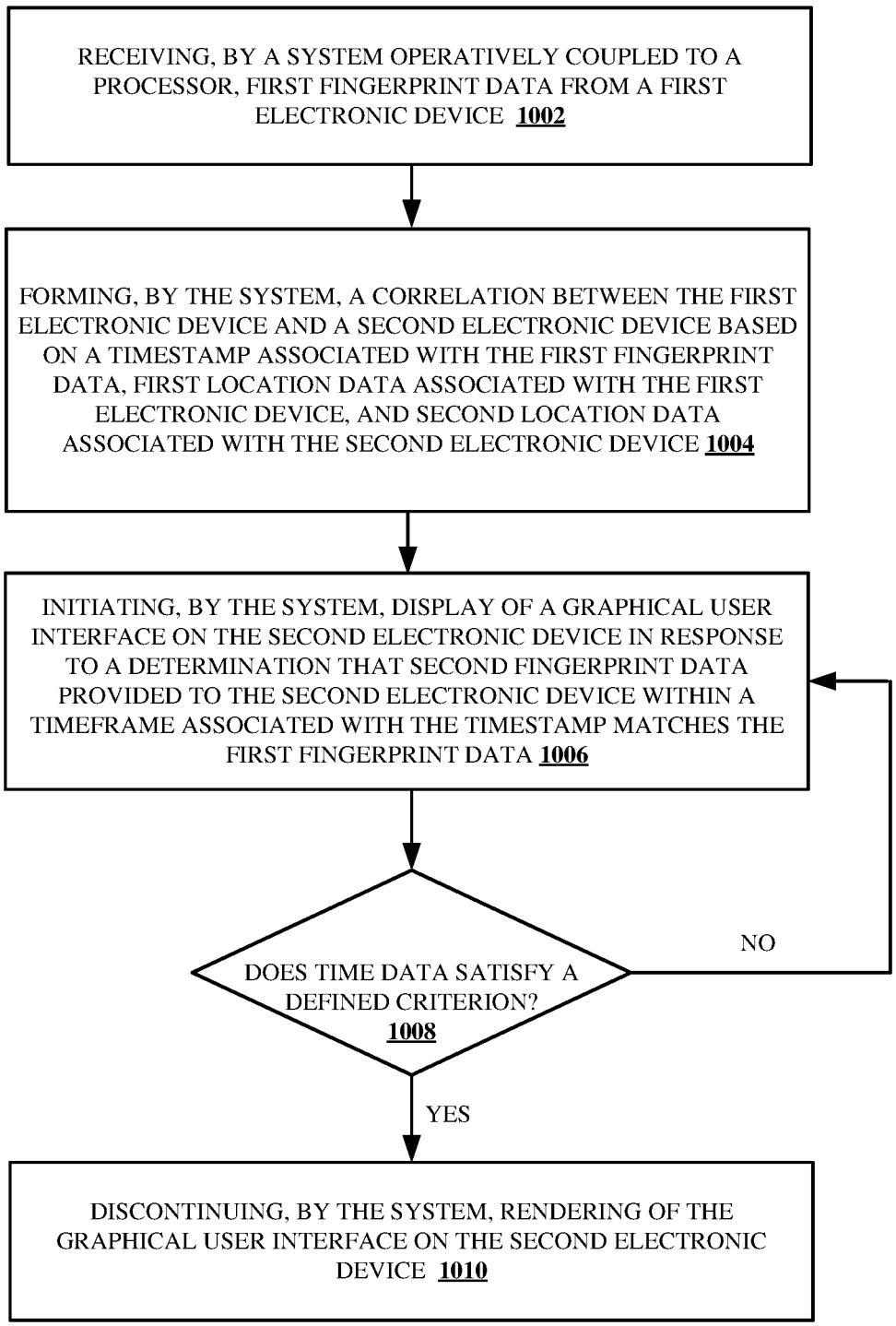
FIG. 10 illustrates a flow diagram of another example, non-limiting method for providing login from an alternate electronic device in accordance with one or more embodiments described herein.

FIGS. 9-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 9, there illustrated is a methodology 900 for providing login from an alternate electronic device, according to one or more embodiments of the subject innovation. At 902, a request message indicative of a request for a user identity related to a first electronic device to access one or more functions of a second electronic device is received, by a system operatively coupled to a processor (e.g., by communication component 104). The request message can be, for example, a terminal computing request related to the user identity. In one embodiment, the request message can be related to a transaction initiated and/or in progress via the first electronic device. For example, the request message can be a request for the user identity to log into the second electronic device and to complete the transaction initiated and/or in progress via the first electronic device.

In certain embodiments, the request message can be generated in response to a determination that a battery life of a battery of the first electronic device satisfies a defined criterion. For example, the request message can be generated in response to a determination that a power level of a battery of the first electronic device corresponds to a defined power level threshold value. In another example, the request message can be generated in response to a determination that a network condition for the first electronic device satisfies a defined criterion. For instance, the request message can be generated in response to a determination that a strength of a communication network for the first electronic device corresponds to a defined signal strength threshold value. In yet another example, the request message can be generated in response to a determination that a user initiates the request message via a graphical user interface of the first electronic device. For instance, the request message can be generated in response to a determination that a command button for an application program on the first electronic device is activated via a graphical user interface associated with an application program.

At 904, first fingerprint data is received, by the system (e.g., by communication component 104), from the first electronic device. The first fingerprint data can be an encrypted version of a fingerprint of a user associated with the user identity. Furthermore, the first fingerprint data can be employed to verify the user and/or to log the user into the first electronic device. As such, the first fingerprint data can be biometric data for the user (e.g., the user identity) related to the first electronic device. In an embodiment, the first fingerprint data can be generated by an operating system of the first electronic device. In another embodiment, the first fingerprint data can be included in hash data. The hash data can be an encrypted string of data generated by a hash function. For example, the hash data can be an encrypted version of a digital data signature that corresponds to at least the fingerprint data. In an aspect, the hash data can include a time-based one-way hash (e.g., a time-based token). For instance, in certain embodiments, the hash data can additionally include a timestamp associated with the request message. The timestamp can be an interval of time with a beginning time correspond to generation of the request message and an ending time corresponding to an end of time period to allow the user identity to access the second electronic device.

At 906, a graphical user interface is displayed, by the system (e.g., by correlation component 106 and/or security component 108), on the second electronic device in response to a determination that second fingerprint data provided to the second electronic device within a timeframe associated with a timestamp matches the first fingerprint data. For example, a graphical user interface associated with a terminal computing session can be displayed on the second electronic device in response to a determination that second fingerprint data provided to the second electronic device within a timeframe associated with a timestamp matches the first fingerprint data. In embodiment, the user can complete the transaction via the graphical user interface displayed on the second electronic device. The second fingerprint data can be generated in response to the user (e.g., the user identity) placing a finger on a fingerprint scanner (e.g., a fingerprint identity sensor) of the second electronic device. The second fingerprint data can be an encrypted version of a fingerprint of a user associated with the user identity that is provided to the second electronic device. Furthermore, the second fingerprint data can be employed to verify the user and/or to log the user into the second electronic device. As such, the second fingerprint data can be biometric data for the user (e.g., the user identity) that is provided to the second electronic device. In another embodiment, the first fingerprint data can be retrieved from a service provider or another electronic device in response to a request to access information related to the first electronic device. Alternatively, the first fingerprint data can be retrieved from a service provider or another electronic device in response to a determination that the second fingerprint data is translated and transmitted to the service provider for correlation. As such, in certain embodiments, authentication of the user identity associated with the second electronic device can be performed by the service provider rather than the second electronic device. In certain embodiments, a virtual machine can be generated to display the graphical user interface on the second electronic device. For example, a virtual machine that displays the graphical user interface on the second electronic device can be initiated in response to a determination that second fingerprint data provided to the second electronic device within a timeframe associated with a timestamp matches the first fingerprint data. In certain embodiments, a transaction executed via the second electronic device and related to a user identity associated with the first electronic device can be processed in response to the displaying the graphical user interface on the second electronic device.

At 908, it is determined whether time data satisfies a defined criterion. If no, the methodology 900 returns to 906. If yes, the methodology 900 proceeds to 910.

At 910, rendering of the graphical user interface on the second electronic device is discontinued, by the system (e.g., security component 108). For example, rendering of the graphical user interface on the second electronic device can be discontinued based on time data indicative of an interval of time for the second electronic device to render the graphical user interface. In another example, rendering of the graphical user interface on the second electronic device can be discontinued in response to a certain action associated with the graphical user interface (e.g., a user logging off). In yet another example, rendering of the graphical user interface on the second electronic device can be discontinued in response to a detection of a new user by the second electronic device (e.g., by a camera of the second electronic device, etc.). In yet another example, rendering of the graphical user interface on the second electronic device can be discontinued in response to a determination that a location of the second electronic device satisfies a defined criterion (e.g., that the second electronic devices has departed from a geofence, etc.). In certain embodiments, the methodology 900 can additionally or alternatively include performing a facial recognition process associated with the second fingerprint data to facilitate logging in the user into the second electronic device.

Referring to FIG. 10, there illustrated is a methodology 1000 for providing login from an alternate electronic device, according to one or more embodiments of the subject innovation. At 1002, first fingerprint data is received, by a system operatively coupled to a processor (e.g., by communication component 104), from a first electronic device. The first fingerprint data can be an encrypted version of a fingerprint of a user associated with a user identity related to the first electronic device. Furthermore, the first fingerprint data can be employed to verify the user and/or to log the user into the first electronic device. As such, the first fingerprint data can be biometric data for the user (e.g., the user identity) related to the first electronic device. In an embodiment, the first fingerprint data can be generated by an operating system of the first electronic device. In another embodiment, the first fingerprint data can be included in hash data. The hash data can be an encrypted string of data generated by a hash function. For example, the hash data can be an encrypted version of a digital data signature that corresponds to at least the fingerprint data. In an aspect, the hash data can be a time-based one-way hash (e.g., a time-based token).

At 1004, a correlation between the first electronic device and a second electronic device is formed, by the system (e.g., by correlation component 106), based on a timestamp associated with the first fingerprint data, first location data associated with the first electronic device, and second location data associated with the second electronic device. For instance, in certain embodiments, the hash data that includes the first fingerprint data can additionally include a timestamp associated with a request message associated with a terminal computing session via the second electronic device. The timestamp can be an interval of time with a beginning time correspond to generation of the request message and an ending time corresponding to an end of time period to allow the user identity to access the second electronic device. The first location data can be associated with a location of the first electronic device during generation of the request message and/or the timestamp. The second location data can be associated with a location of the second electronic device with respect to the first electronic device.

At 1006, display of a graphical user interface on the second electronic device is initiated, by the system (e.g., by correlation component 106 and/or security component 108), in response to a determination that second fingerprint data provided to the second electronic device within a timeframe associated with the timestamp matches the first fingerprint data. For example, a graphical user interface associated with a terminal computing session can be displayed on the second electronic device in response to a determination that second fingerprint data provided to the second electronic device within a timeframe associated with a timestamp matches the first fingerprint data. In embodiment, the user can complete the transaction via the graphical user interface displayed on the second electronic device. The second fingerprint data can be generated in response to the user (e.g., the user identity) placing a finger on a fingerprint scanner (e.g., a fingerprint identity sensor) of the second electronic device. The second fingerprint data can be an encrypted version of a fingerprint of a user associated with the user identity that is provided to the second electronic device. Furthermore, the second fingerprint data can be employed to verify the user and/or to log the user into the second electronic device. As such, the second fingerprint data can be biometric data for the user (e.g., the user identity) that is provided to the second electronic device. In certain embodiments, a virtual machine can be generated to display the graphical user interface on the second electronic device. For example, a virtual machine that displays the graphical user interface on the second electronic device can be initiated in response to a determination that second fingerprint data provided to the second electronic device within a timeframe associated with a timestamp matches the first fingerprint data. In certain embodiments, a transaction executed via the second electronic device and related to a user identity associated with the first electronic device can be processed in response to the displaying the graphical user interface on the second electronic device.

At 1008, it is determined whether time data satisfies a defined criterion. If no, the methodology 1000 returns to 1006. If yes, the methodology 1000 proceeds to 1010.

At 1010, rendering of the graphical user interface on the second electronic device is discontinued, by the system (e.g., security component 108). For example, rendering of the graphical user interface on the second electronic device can be removed from a display of the second electronic device based on time data indicative of an interval of time for the second electronic device to render the graphical user interface. In another example, rendering of the graphical user interface on the second electronic device can be discontinued in response to a certain action associated with the graphical user interface (e.g., a user logging off). In yet another example, rendering of the graphical user interface on the second electronic device can be discontinued in response to a detection of a new user by the second electronic device (e.g., by a camera of the second electronic device, etc.). In yet another example, rendering of the graphical user interface on the second electronic device can be discontinued in response to a determination that a location of the second electronic device satisfies a defined criterion (e.g., that the second electronic devices has departed from a geofence, etc.).

In certain embodiments, the methodology 1000 can additionally or alternatively include performing a facial recognition process associated with the second fingerprint data to facilitate logging in the user into the second electronic device. In certain embodiments, the methodology 1000 can additionally or alternatively include determining a type of application program associated with the second electronic device to render via the graphical user interface based on user data for a user identity associated with the first electronic device. In certain embodiments, the methodology 1000 can additionally or alternatively include initiating display of the graphical user interface on the second electronic device based on time data indicative of an interval of time for the second electronic device to render the graphical user interface. In certain embodiments, the correlation between the first electronic device and the second electronic device can be a first correlation and the methodology 1000 can additionally or alternatively include forming a second correlation between the first electronic device and a third electronic device within the geographic area associated with the first electronic device based on the timestamp, the first location data associated with the first electronic device, and third location data associated with the third electronic device. The third location data can be associated with a location of the third electronic device with respect to the first electronic device. Furthermore, in certain embodiments, the graphical user interface associated with the second electronic device can be a first graphical user interface and the methodology 1000 can additionally or alternatively include initiating display of a second graphical user interface on the third electronic device in response to a determination that third fingerprint data provided to the third electronic device within the timeframe associated with the timestamp matches the first fingerprint data associated with the hash data. The third fingerprint data can be generated in response to the user (e.g., the user identity) placing a finger on a fingerprint scanner (e.g., a fingerprint identity sensor) of the third electronic device. The third fingerprint data can be an encrypted version of a fingerprint of a user associated with the user identity that is provided to the third electronic device. Furthermore, the third fingerprint data can be employed to verify the user and/or to log the user into the third electronic device. As such, the third fingerprint data can be biometric data for the user (e.g., the user identity) that is provided to the third electronic device.

Figure 11:
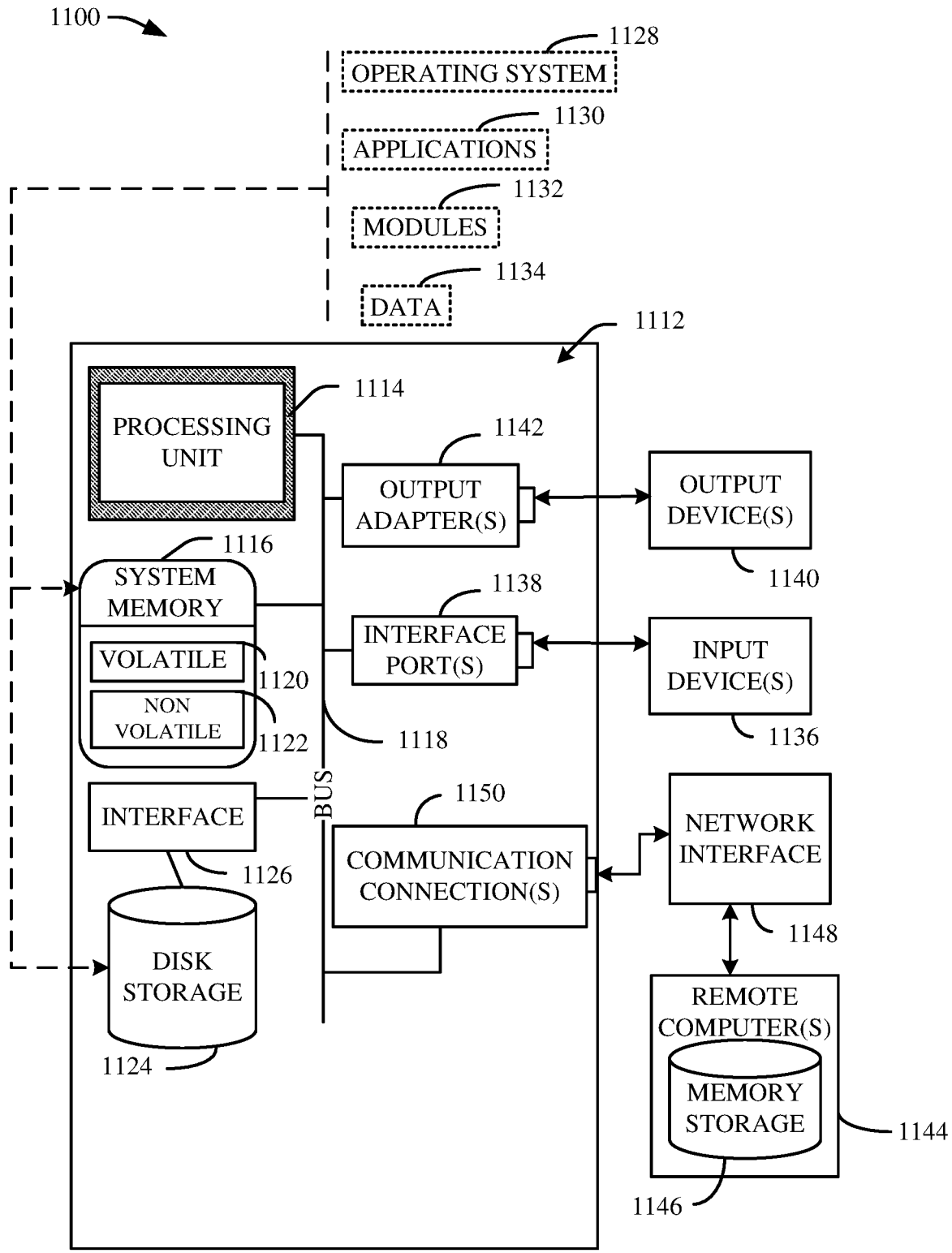
FIG. 11 is a schematic block diagram illustrating a suitable operating environment.
Figure 12:
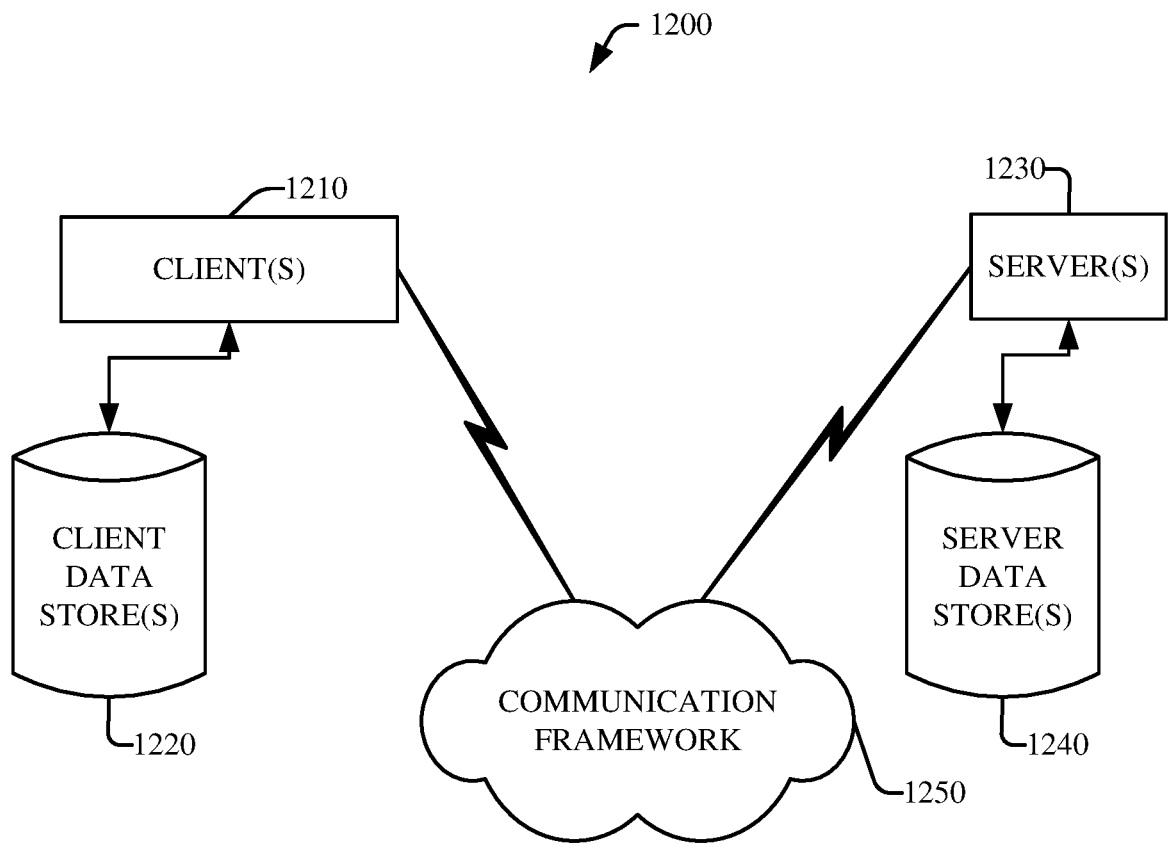
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118.

The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as interne protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor;
   a network interface device; and
   a non-transitory computer-readable medium having stored thereon instructions executable to cause the system to perform operations comprising:
      based on a determination that a first electronic device of a user satisfies a defined criterion associated with a computing session transfer request for a computing session of the first electronic device, receiving encoded data associated with first user biometric data for the user, and receiving a timestamp from the first electronic device, wherein the first user biometric data corresponds to biometric data stored on the first electronic device, and wherein the computing session of the first electronic device corresponds to an application executing on the first electronic device;
      forming a correlation between the first electronic device and a second electronic device within a limited spatial area associated with the first electronic device based on the timestamp, first location data associated with the first electronic device, and second location data associated with the second electronic device; and
      continuing the computing session of the first electronic device on the second electronic device, wherein continuing the computing session comprises:
         receiving, at the second electronic device, second user biometric data for the user;
         determining that the second user biometric data is received within a timeframe corresponding to the timestamp received from the first electronic device;
         verifying that the second user biometric data matches the first user biometric data that corresponds to the biometric data stored on the first electronic device; and
         responsive to verifying that the second user biometric data matches the first user biometric data and determining the second user biometric data is received within the timeframe, initiating a computing process on the second electronic device that displays a graphical user interface on the second electronic device, wherein the graphical user interface is associated with the application executing on the first electronic device and includes a user-selectable option to enable the application to be resumed on the second electronic device.

2. The system of claim 1, wherein the operations further comprise:
   responsive to a user selection of the user-selectable option to enable the application to be resumed on the second electronic device, launching a new instance of the application on the second electronic device.

3. The system of claim 2, wherein the operations further comprise:
   receiving application resumption information corresponding to the application; and
   wherein launching the new instance of the application on the second electronic device is based on the second electronic device providing the application resumption information to the new instance of the application.

4. The system of claim 1, wherein continuing the computing session comprises displaying, via the second electronic device, a set of information at least one visibly displayed user-selectable control element that were previously displayed on the application executing on the first electronic device.

5. The system of claim 4, wherein the operations further comprise:
receiving, at the second electronic device, a user selection of the at least one visibly displayed user-selectable control element; and
executing a transaction on the second electronic device based on the user selection, wherein the transaction was initiated on the first electronic device.

6. The system of claim 5, wherein the transaction comprises an electronic purchase transaction.

7. The system of claim 1, wherein the system comprises the second electronic device.

8. The system of claim 1, wherein the encoded data is encoded using a hash function.

9. The system of claim 1, further comprising:
a biometric input sensor;
wherein the second user biometric data for the user is received via the biometric input sensor.

10. The system of claim 9, wherein the biometric input sensor is a fingerprint sensor.

11. A non-transitory computer-readable medium having stored thereon instructions that are executable by a second electronic device to cause the second electronic device to perform operations comprising:
based on a determination that a first electronic device of a user satisfies a defined criterion associated with a computing session transfer request for a computing session of the first electronic device, receiving encoded data associated with first user biometric data for the user, and receiving a timestamp from the first electronic device, wherein the first user biometric data corresponds to biometric data stored on the first electronic device, and wherein the computing session of the first electronic device corresponds to an application executing on the first electronic device;
confirming a physical presence of the first electronic device and the second electronic device within a limited spatial area associated with the first electronic device based on the timestamp, first location data associated with the first electronic device, and second location data associated with the second electronic device; and
based on the physical presence of the first electronic device and the second electronic device within the limited spatial area, continuing the computing session of the first electronic device on the second electronic device, wherein continuing the computing session comprises:
receiving, at the second electronic device, second user biometric data for the user;
determining that the second user biometric data is received within a timeframe corresponding to the timestamp received from the first electronic device;
verifying that the second user biometric data matches the first user biometric data that corresponds to the biometric data stored on the first electronic device; and
responsive to verifying that the second user biometric data matches the first user biometric data and determining the second user biometric data is received within the timeframe, initiating a virtual machine on the second electronic device that emulates the application executed by the first electronic device by displaying a graphical user interface on the second electronic device, wherein the graphical user interface includes a user-selectable option to enable the application to be resumed on the second electronic device.

12. The non-transitory computer-readable medium of claim 11, wherein the operations further comprise:
responsive to a user selection of the user-selectable option to enable the application to be resumed on the second electronic device, launching a new instance of the application on the second electronic device.

13. The non-transitory computer-readable medium of claim 12, wherein the operations further comprise:
receiving application resumption information corresponding to the application; and
wherein launching the new instance of the application on the second electronic device is based on the second electronic device providing the application resumption information to the new instance of the application.

14. The non-transitory computer-readable medium of claim 11, wherein continuing the computing session comprises displaying, via the second electronic device, a set of information at least one visibly displayed user-selectable control element that were previously displayed on the application executing on the first electronic device.

15. The non-transitory computer-readable medium of claim 14, wherein the operations further comprise:
receiving, at the second electronic device, a user selection of the at least one visibly displayed user-selectable control element; and
executing a transaction on the second electronic device based on the user selection, wherein the transaction was initiated on the first electronic device.

16. A method, comprising:
based on a determination that a first electronic device of a user satisfies a defined criterion associated with a computing session transfer request for a computing session of the first electronic device, receiving encoded data associated with first user biometric data for the user, and receiving a timestamp from the first electronic device, wherein the first user biometric data corresponds to biometric data stored on the first electronic device, and wherein the computing session of the first electronic device corresponds to an application executing on the first electronic device;
confirming a physical presence of the first electronic device and a second electronic device within a limited spatial area associated with the first electronic device based on the timestamp, first location data associated with the first electronic device, and second location data associated with the second electronic device; and
based on the physical presence of the first electronic device and the second electronic device within the limited spatial area, continuing the computing session of the first electronic device on the second electronic device, wherein continuing the computing session comprises:
receiving, at the second electronic device, second user biometric data for the user;
determining that the second user biometric data is received within a timeframe corresponding to the timestamp received from the first electronic device;
verifying that the second user biometric data matches the first user biometric data that corresponds to the biometric data stored on the first electronic device; and
responsive to verifying that the second user biometric data matches the first user biometric data and determining the second user biometric data is received within the timeframe, emulating the application executed by the first electronic device by displaying a graphical user interface on the second electronic device, wherein the graphical user interface includes a user-selectable option to enable the application to be resumed on the second electronic device.

17. The method of claim 16, wherein the limited spatial area corresponds to a wireless transmission range of the first electronic device using a first wireless communication protocol.

18. The method of claim 17, wherein the first wireless communication protocol comprises a BLUETOOTH protocol.

19. The method of claim 16, wherein the first electronic device is a smartphone device, and the second electronic device is an electronic device type other than a smartphone device type.

20. The method of claim 16, wherein the first user biometric data and the second user biometric data comprise fingerprint data.

\* \* \* \* \*